US 6,557,544 B2

(12) United States Patent
Sim

(10) Patent No.: US 6,557,544 B2
(45) Date of Patent: May 6, 2003

(54) CHARCOAL COOKER

(75) Inventor: Yeong Seob Sim, Seoul (KR)

(73) Assignee: A-Tech Engineering Co., Ltd., Kyungki-do (KR)

( * ) Notice: Subject to any disclaimer, the term of this patent is extended or adjusted under 35 U.S.C. 154(b) by 0 days.

(21) Appl. No.: 09/752,542

(22) Filed: Dec. 29, 2000

(65) Prior Publication Data

US 2001/0017131 A1 Aug. 30, 2001

(30) Foreign Application Priority Data

Dec. 31, 1999 (KR) .............................. 99-68342

(51) Int. Cl.[7] .............................. F24C 3/00; A47J 37/00
(52) U.S. Cl. .................. 126/25 A; 126/41 R; 126/9 B; 99/443 R
(58) Field of Search ................ 126/25 R, 25 A, 126/25 AA, 9 R, 41 R, 9 B; 99/443 R, 444

(56) References Cited

U.S. PATENT DOCUMENTS

| 3,048,162 | A | * | 8/1962 | Gauss | 126/25 A |
|---|---|---|---|---|---|
| 5,163,359 | A | * | 11/1992 | McLane | 126/25 R |
| 5,213,075 | A | * | 5/1993 | Stephen et al. | 126/41 R |
| 5,452,706 | A | * | 9/1995 | Meza | 126/9 R |
| 5,458,053 | A | * | 10/1995 | Hsiao | 126/25 A |
| 5,884,554 | A | * | 3/1999 | Sprick | 126/25 A |
| 5,931,148 | A |  | 8/1999 | Freeman |  |
| 5,970,971 | A | * | 10/1999 | Wu | 126/25 R |
| 6,357,434 | B1 | * | 3/2002 | Bossler | 126/25 A |

FOREIGN PATENT DOCUMENTS

| DE | 1 454 157 A | * | 8/1969 |
| JP | 9-65985 A | * | 3/1997 |
| JP | 09-065985 |  | 3/1997 |
| JP | 11-070046 |  | 3/1999 |
| KR | 1999-19483 |  | 5/1999 |
| KR | 1999-0064953 |  | 8/1999 |

* cited by examiner

Primary Examiner—Henry Bennett
Assistant Examiner—Josiah C. Cocks
(74) Attorney, Agent, or Firm—Akin, Gump, Strauss, Hauer & Feld, L.L.P.

(57) ABSTRACT

The present invention relates to a charcoal cooker being easy to kindle a charcoal and to adjust heat applied to food in cooking. The charcoal cooker comprises: a charcoal burning part for containing and burning charcoal; a cooking part for cooking food by use of heat emitted from the charcoal burning part, a housing for defining an inner space with a top opening; an inner dish arranged on a bottom of said housing for receiving filth and defining said charcoal burning part; a fuel rack arranged at a position spaced from a bottom of said inner dish and in said inner dish; a support means adapted to support a food holder over said fuel rack; and a food holder lifting means adapted to adjust a gap between said fuel rack and said food holder supported by said support means by displacing said support means. The charcoal cooker may further comprises a charcoal kindling means adapted to kindle charcoal on said fuel rack by emitting flame from under said fuel rack; a cover constructed to close said top opening of said housing; and legs for supporting said housing at a height properly spaced from the ground.

29 Claims, 35 Drawing Sheets

US 6,557,544 B2

CHARCOAL COOKER

TECHNICAL FIELD

The present invention relates to a charcoal cooker using charcoal as fuel, more specifically to a charcoal cooker being easy to kindle a charcoal and adjustment of heat applied to food in cooking.

BACKGROUND OF THE INVENTION

Although a charcoal cooker associated with the present invention generally uses charcoal made by carbonization of wood as fuel, the charcoal cooker may use similar materials such as oval briquette or holed charcoal molded from charcoal powders. In this specification, such materials are referred to as charcoal.

Suppose that a charcoal cooker is defined as "a brazier for cooking food by means of heat generated by burning charcoal", such charcoal cooker has been variously developed and used.

The conventional charcoal cooker has problems due to a peculiar characteristic that it is more difficult to kindle a charcoal than other fuels.

That is, flame with energy of very high temperature needs to be applied for a long time for kindling charcoal. Flame generated by burning of the kindling materials such as paper or oilpaper or BUNGAETANTM is used in the conventional charcoal cooker. Most of the kindling materials generate smoke, soot and smell so that kindling charcoal indoors is not desirable. Thus, after kindling charcoal outdoors, different burning vessel or a charcoal cooker containing kindled charcoals must be brought to indoors. Moreover, when energy of flame generated by burning of the kindling materials is not sufficient to kindle a charcoal, a blower must be used to promote the burning.

Because of such a troublesome and time-consumptive process of kindling a charcoal, as well as because of smoke, soot and smell in the process of kindling a charcoal, users prefer a cooker using other fuel to a charcoal cooker.

There is a possibility that soot generated in the process of kindling a charcoal and ashes resulted from the burning of the kindling materials are taken into human-body, such soot and ashes containing a lot of harmful components such as dioxin.

Inventors of the present invention developed a new charcoal cooker in order to solve the above problems of the conventional charcoal cooker, filed it with Korean Industrial Property Office and obtained an patent application number 10-1999-0019438 (filing date: May 28, 1999).

In the specification, the inventors suggested to provide a charcoal kindler using gas in the charcoal cooker in order to facilitate kindling a charcoal.

On the other hand, ashes resulted from the burning of the kindling materials or fuel is accumulated on the bottom of the charcoal cooker and such ash curdles with oil flowed out from food cooked, such curdled ashes making cleaning of the charcoal cooker difficult.

Also, the coated film of the housing forming inner space for burning fuel changes its color or is damaged, and inner metal thereof is easily corroded. Also, when a user comes in contact with the housing heated in use, there is a possibility that the user gets burnt.

BRIEF SUMMARY OF THE INVENTION

Therefore, the present invention is made in order to solve the above conventional problems.

An object of the present invention is to provide a charcoal cooker comprising a charcoal kindler using gas, which has a simple structure and has good convenience and good durability in use and keeping thereof.

Another object of the present invention is to provide a charcoal cooker capable of completing cleaning by washing only a part of its elements after use thereof.

Also, another object of the present invention is to provide a charcoal cooker having a structure capable of remarkably reducing or nearly removing an amount of heat transferred from a burning part to a housing thereof in burning.

Still another object of the present invention is to provide a charcoal cooker including a charcoal kindling means capable of rapidly kindling charcoal by means of a simple operation without generating smoke or soot.

Still another object of the present invention is to provide a charcoal cooker capable of finely and rapidly controlling an amount of heat applied to food in cooking.

Still another object of the present invention is to provide a charcoal cooker including a multi-functional housing capable of being used in place of a table in use and receiving all elements folded to form a compact structure in keeping.

In order to accomplish the above objects, according to the present invention, a charcoal cooker comprising a charcoal burning part adapted to contain and burn a charcoal and a cooking part adapted to cook a food by means of heat emitted from the charcoal burning part is provided.

The charcoal cooker comprises: a housing for defining an inner space with a top opening; an inner dish arranged on a bottom of said housing for receiving filth and for defining said charcoal burning part; a fuel rack arranged at a position spaced from a bottom of said inner dish and within said inner dish; a support means adapted to support a food holder over said fuel rack; and a food holder lifting means adapted to adjust a gap between said fuel rack and the food holder supported by said support means by displacing said support means.

Also, the charcoal cooker may further comprise a charcoal kindling means adapted to kindle a charcoal on said fuel rack by emitting flame from under said fuel rack.

Also, it is preferable that said food holder lifting means displaces said support means to lift the food holder supported by said support means.

Also, the charcoal cooker may further comprise a cover constructed to close said top opening of said housing.

Also, the charcoal cooker may further comprise legs for supporting said housing at a height properly spaced from the ground.

It is preferable that said support means consists of two support rods having equal shape, wherein assuming that 3 dimensional coordinate system has an X-axis extended in a width direction of said inner dish, each of said support rods has one X-linear portion extended in X-axis direction, two Y-bended portions extended from both ends of said X-linear portion and bended toward Y-axis by 90°, and at least one Z-bended portion extended from the end of at least one of said two Y-bended portions and bended toward Z-axis by about 45°, and wherein each of said support rods is supported to freely swing at a transit portion between said Y-bended portion and said Z-bended portion by at least one longitudinal sidewall of said inner dish.

Said two support rods may be crossed at said transit portion between said Y-bended portion and said Z-bended portion and arranged in a relationship of plane symmetry.

Said two support rods are separated from each other and arranged in a relationship of plane symmetry.

Said two support rods are separated from each other and arranged toward equal direction.

It may be desirable that each of said two support rods includes a hinge ring attached to said transit portion between said Y-bended portion and said Z-bended portion, while a hinge pin attached to said inner dish and inserted into said hinge ring.

In the case that said two support rods are separated from each other and arranged toward equal direction, It is preferable that the charcoal cooker further comprises assistant rods bended to form U shape, and holes punched in a width-directional flange of said inner dish to loosely receive said assistant rods, while said assistant rods of U shape is crossed by a upper side of said X-linear portion in a overturned state and adapted to be inserted into said punched holes in said width-directional flange of said inner dish.

Also, the charcoal cooker may further comprise a horizontal-position-keeper for preventing the food holder supported by said support means from horizontally moving when said food holder lifting means displaces said support means.

It is preferable that said horizontal-position-keeper comprises guide rods bended to form U shape, and holes punched in a width-directional flange of said inner dish to loosely receive said guide rods, while said U-shaped guide rods is adapted to pass through holes punched in said food holder supported by said X-linear portion of said support rods and to be inserted into said punched holes in said width-directional flange of said inner dish.

Preferably, said food holder lifting means applies horizontal force to said at least one Z-bended portion of said support rods to swing each of said support rods so that said X-linear portion of said support rods is lifted.

It is also preferred that said food holder lifting means comprises: at least one transfer screw supported to be free to rotate by at least one longitudinal sidewall of said housing; two nut blocks provided on said transfer screw and constructed to move on said transfer screw when said transfer screw is rotated; a restriction pin for limiting the position of said Z-bended portion of said support rods when said nut blocks moves; and a driving means for rotating said transfer screw.

Desirably, said food holder lifting means comprises two transfer screws provided one by one on both longitudinal sidewalls of said housing and an electric motor means operatively connecting said two transfer screws, while a first transfer screw of said two transfer screws is rotated by said driving means, and wherein a second transfer screw of said two transfer screws is rotated by gearing with rotation of said first transfer screw.

Said driving means may comprise an electric motor.

Preferably, said charcoal kindling means comprises a gas supply part, a mixture gas jet nozzle and a gas igniter, wherein said mixture gas jet nozzle is provided under said inner dish, and wherein said inner dish is provided with at least a mixture gas inlet hole for importing the mixture gas jetted from said mixture gas jet nozzle into said inner dish.

It is preferable that said mixture gas jet nozzle is formed of a pipe having at least a series of mixture gas jet holes, while said mixture gas inlet hole is formed by a slot aligned with a series of mixture gas jet holes.

Alternatively, said mixture gas jet nozzle is formed of pipe curved to form a ring, along which at least a series of mixture gas jet holes are punched, while a circular hole for receiving said mixture gas jet nozzle is punched in a center of the bottom of said inner dish, preferably a circular ceiling being provided over said circular hole.

Preferably, said gas igniter has a gas control knob exposed from a sidewall of said housing.

Alternatively, said gas igniter has a gas control knob exposed from a top surface of said housing.

Said gas supply part may be adapted to fit a portable butane fuel vessel thereto, while a space for receiving said portable butane fuel vessel is provided either within or out of said housing.

It is preferable that said inner dish comprises at least an air inlet formed through sidewalls thereof for permitting air flow and eaves projected inwardly over each air inlet, respectively.

Preferably, said inner dish is adapted to contain water up to a predetermined height from the bottom thereof.

It is also preferred that said cover consists of two members divided along a central line of a longitudinal direction, a first member of said two members being constructed to be connected to the upper side of a first longitudinal sidewall of said housing by a hinge and to pivot on said hinge by 180° from a folded position to an unfolded position, and a second member of said two members being constructed to be connected to the upper side of a second longitudinal sidewall of said housing by a hinge and to pivot on said hinge by 180° from a folded position to an unfolded position.

Also, the charcoal cooker may further comprise two carrying handles attached to said first longitudinal sidewall and said second longitudinal sidewall of said housing, respectively, and at least one projections formed on respective upper surfaces of said first member and said second member of said cover, while said carrying handles support said cover at the unfolded position of when said first and second member of said cover so that said at least one projections serve as a stopper preventing said handles from sliding.

Also, the charcoal cooker may further comprise plane grid members built in the inner side of said first and second member of said cover, respectively, wherein said plane grid members are pivotally coupled to each flange of said first and second member of said cover to pivot on each pivotal axis adjacent to sidewalls thereof.

Preferably, said legs consist of four poles to be inserted into and pulled out from four leg holders provided in said housing.

Alternatively, said legs are constructed such that both ends of a rod bended to form U shape are inserted into support holes formed in a first longitudinal sidewall and a second longitudinal sidewall of said housing to be pivotally coupled, wherein both ends of said rod are bended at right angles such that most of said rod is vertical and a part close to both ends of said rod is horizontal in a state that said legs are unfolded.

The above and other aspects, characteristics and advantages of the present invention will be more clarified upon reading several preferred embodiments below.

BRIEF DESCRIPTION OF THE SEVERAL VIEWS OF THE DRAWINGS

The embodiments of the present invention will be explained with reference to the accompanying drawings, in which.

DETAILED DESCRIPTION OF THE INVENTION

Figure 1:
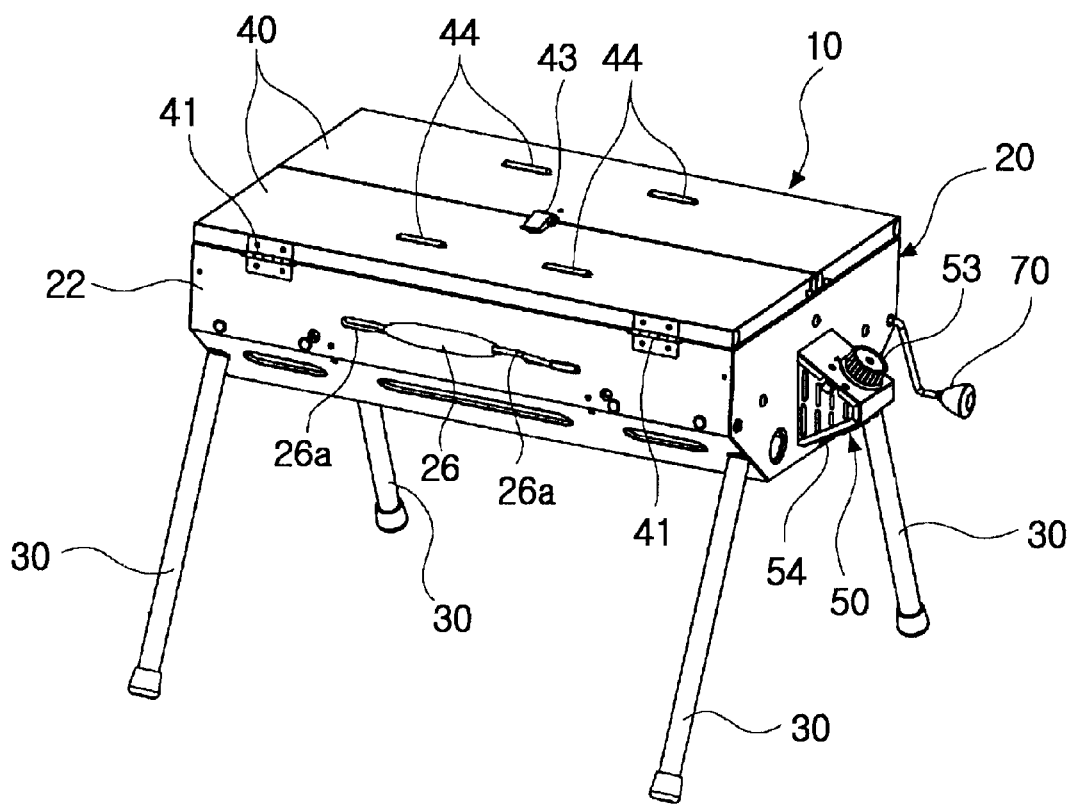
FIG. 1 shows a perspective view of a charcoal cooker according to a first embodiment of the present invention.
Figure 2:
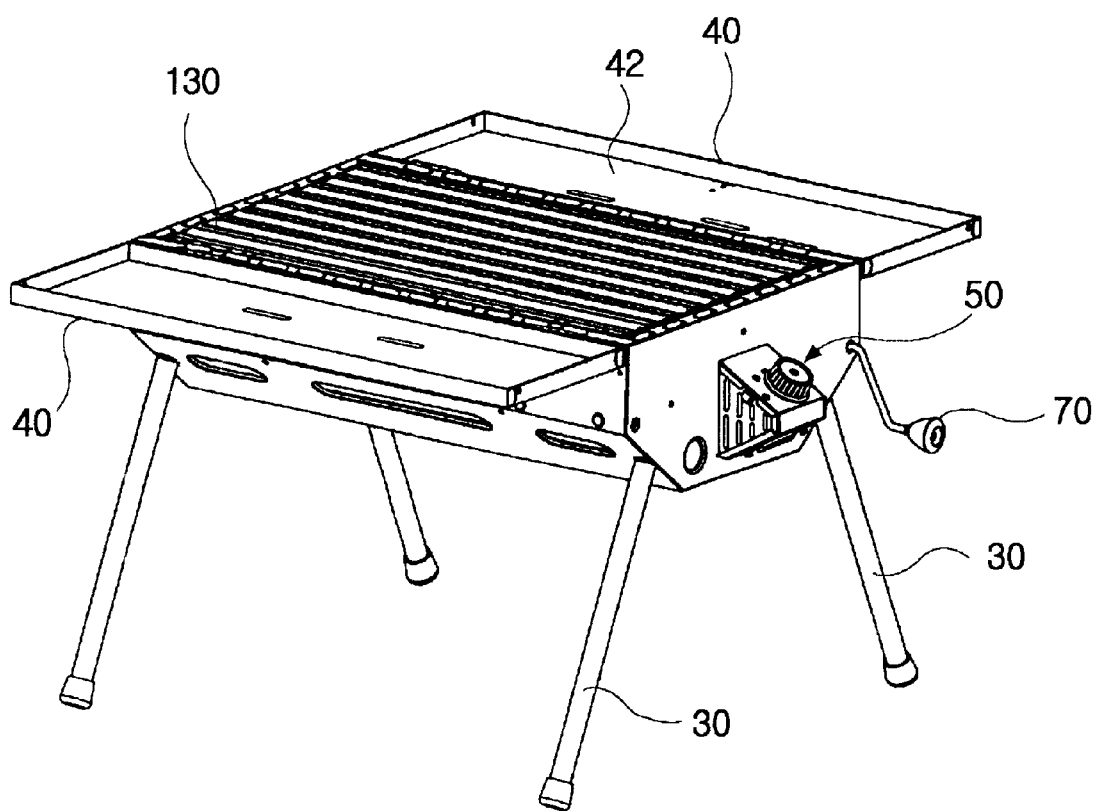
FIG. 2 shows a perspective view of the charcoal cooker shown in FIG. 1, in which a cover is unfolded.

Now, preferred embodiments of a charcoal cooker according to the present invention will be explained in detail.

First Embodiment

FIGS. 1 through 21 illustrate a charcoal cooker according to a first embodiment of the present invention.

The reference numeral 10 points out in general the charcoal cooker through the drawings.

The charcoal cooker 10 according to the first embodiment comprises a inner dish 100 equipped in a housing 20, a fuel rack 120 equipped in the inner dish 100, a support means adapted to support a food holder 130 at a upper side of the fuel rack 120, a charcoal kindling means for kindling charcoal on the fuel rack 120, and a food holder lifting means constructed to lift the food holder 130 supported at the upper side of the fuel rack 120.

Figure 3:
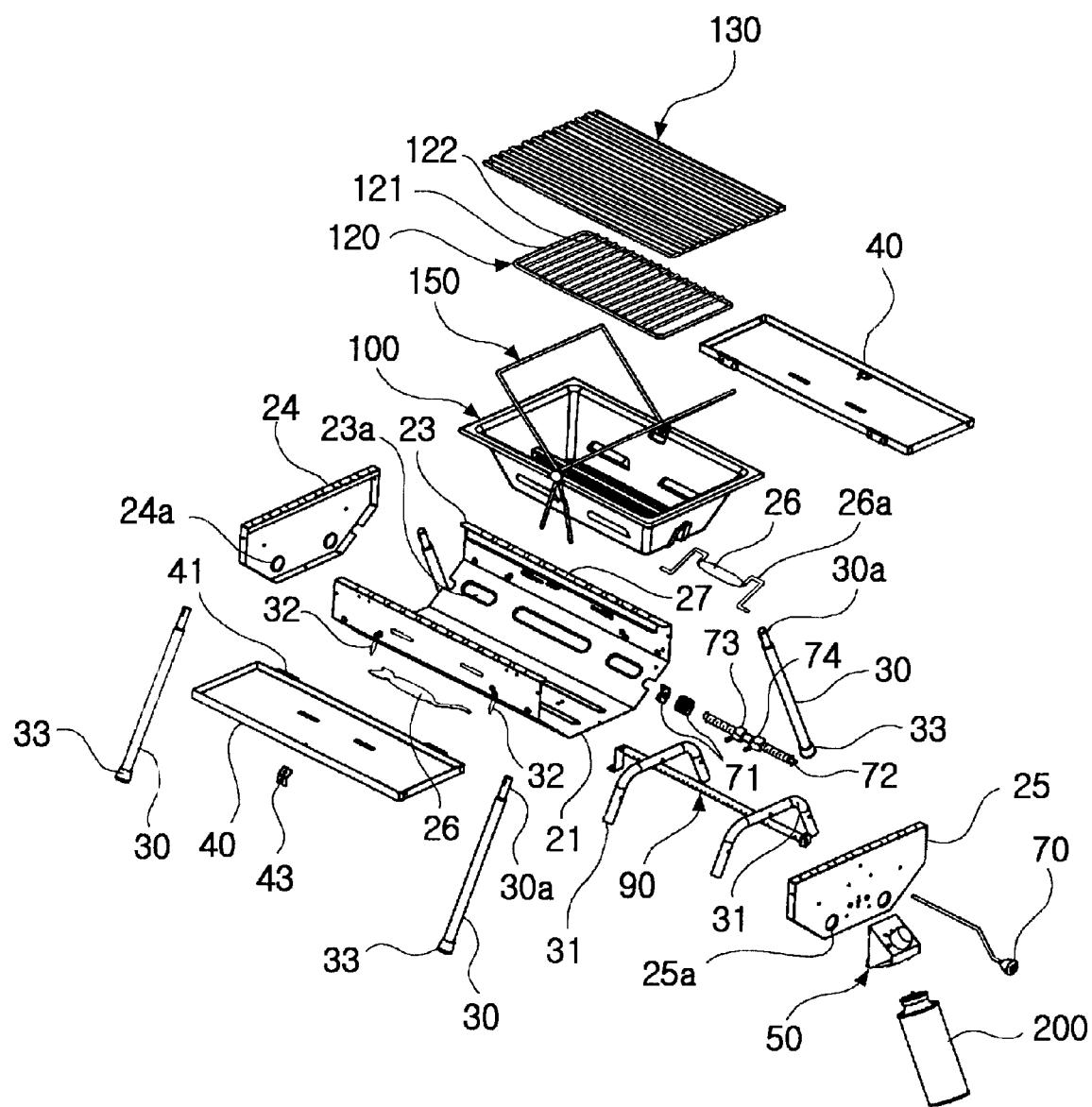
FIG. 3 shows an exploded perspective view of elements of the charcoal cooker shown in FIG. 1.

In the first embodiment, three panels made by pressing metal plates such as stainless steel plates are assembled to form the housing 20. As shown in FIG. 3, a first panel is bended to form a bottom 21 and both longitudinal sidewalls 22 and 23 of the housing 20, a second panel is coupled to one end of the first panel to form a first width-directional sidewall 24 of the housing 20 and a third panel is coupled to the other end of the first panel to form a second width-directional side wall 24 of the housing 20. Coupling the panels is carried out by means of riveting or tightening a screw. A top of the housing 20 assembled from three panels is open.

At least a portion of the longitudinal sidewalls 22 and 23, and the width-directional sidewalls 24 and 25 of the housing 20, more specifically a portion thereof close to a bottom 21 of the housing 20 is punched with a plurality of air inlets 22a, 23a, 24a and 25a.

The charcoal cooker according to the first embodiment has a cover 40 capable of closing a top opening of the housing 20. The cover 40 consists of two members divided along the longitudinal centerline thereof. A first member of the cover 40 is constructed to be connected to the upper side of a first longitudinal sidewall 22 of the housing 20 by a hinge 41 and to pivot on the hinge 41 by 180° from a folded position to an unfolded position. A second member of the cover 40 is constructed to be connected to the upper side of a second longitudinal sidewall 23 of the housing 20 by another hinge 41 and to pivot on the hinge 41 by 180° from a folded position to an unfolded position. When the first member and the second member are at the folded positions, respectively, the top opening of the housing 20 is completely closed. In use, both first member and second member are at unfolded positions and in this state, an inner surface 42 of the cover 40 serves as a table.

The first member and the second member of the cover 40 are provided with a latch 43 shown in FIG. 1 to fix each other at the unfolded position.

Figure 7:
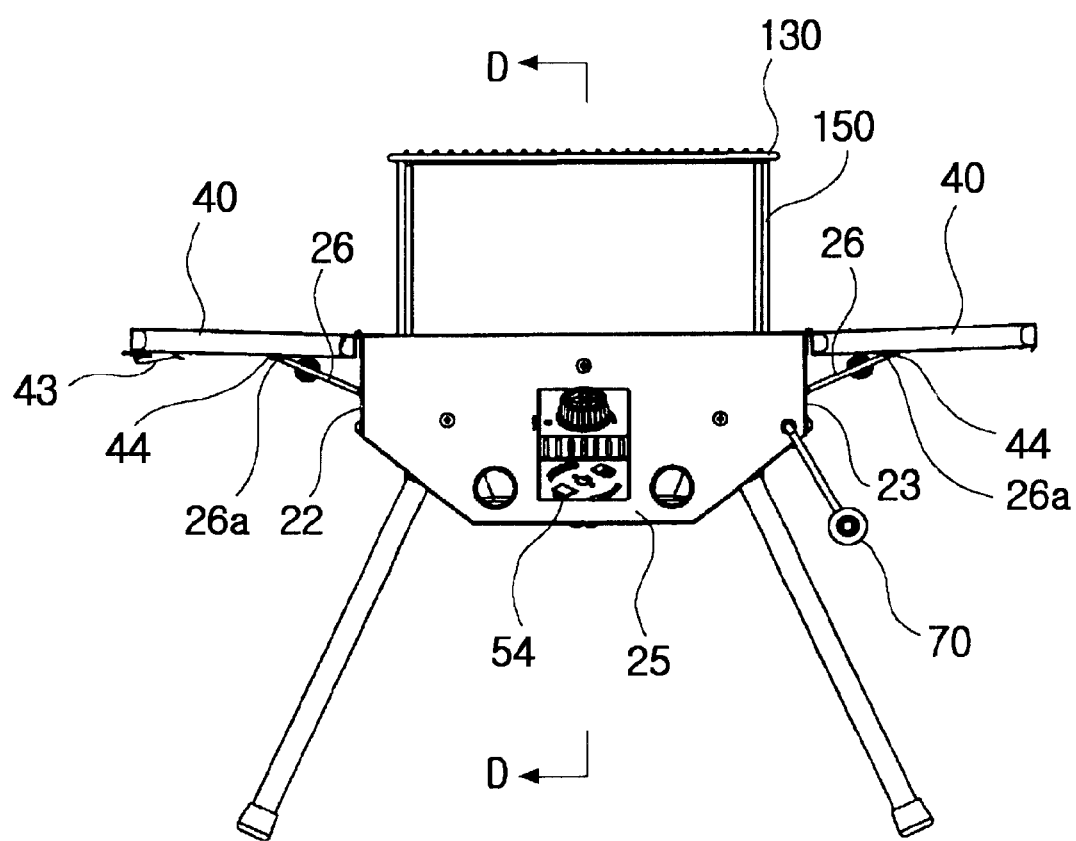
FIG. 7 shows an elevation of the charcoal cooker shown in FIG. 4, viewed in a longitudinal direction of the housing.
Figure 9:
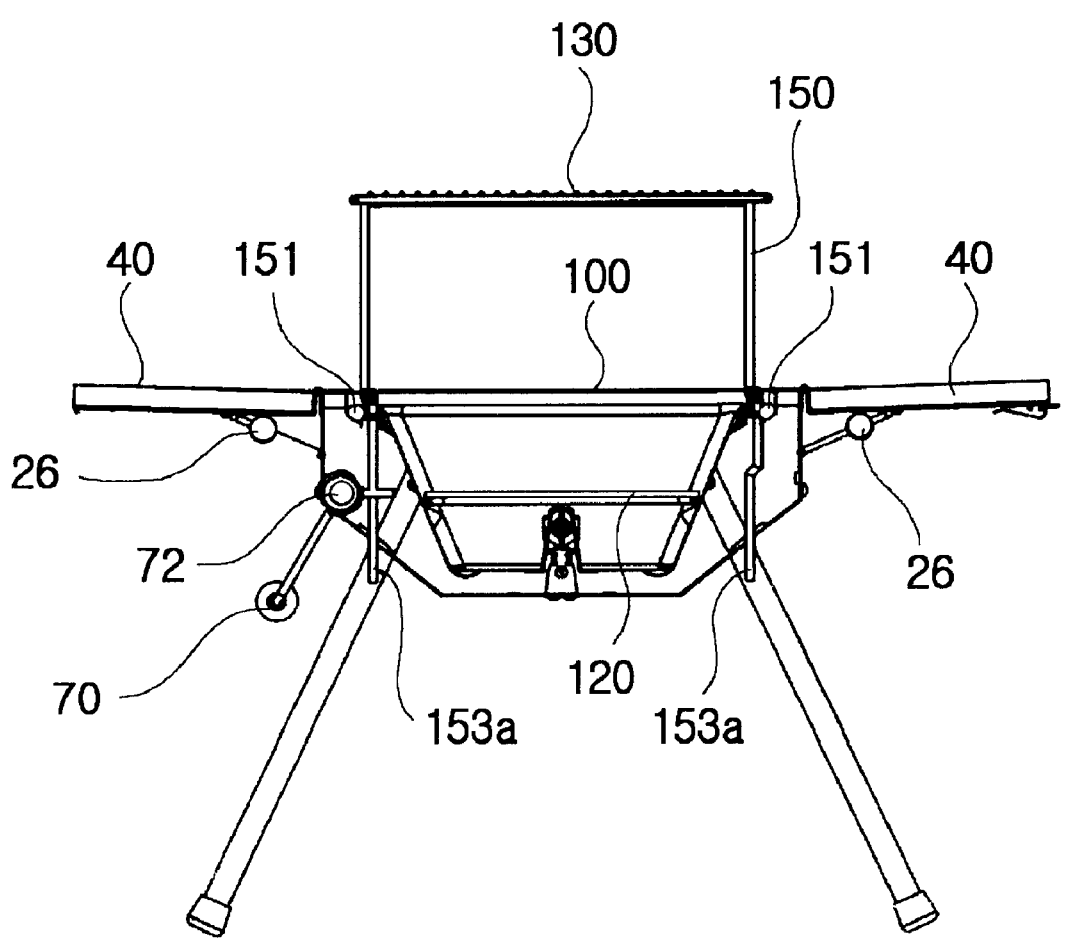
FIG. 9 shows a cross-sectional view of the charcoal cooker, taken along a line C—C of FIG. 5.

Also, two projections 44 are formed in embossing way on the outer surfaces of the first member and the second member, respectively. When the first member and the second member are infolded, the projections 44 serve as stoppers to stop carrying handles 26 attached to the first longitudinal sidewall 22 and the second longitudinal sidewall 23 of the housing 20, as shown in FIG. 7 and 9, so that the carrying handles 26 can support the first member and the second member of the cover 40 not to droop. The carrying handle 26 is pivotally attached to the first longitudinal sidewall 22 and the second longitudinal sidewall 23 of the housing 20.

Now, a construction of a charcoal kindling means consisting of a gas igniter 50 and a mixture gas jet nozzle 90 according to the present invention will be explained.

Figure 4:
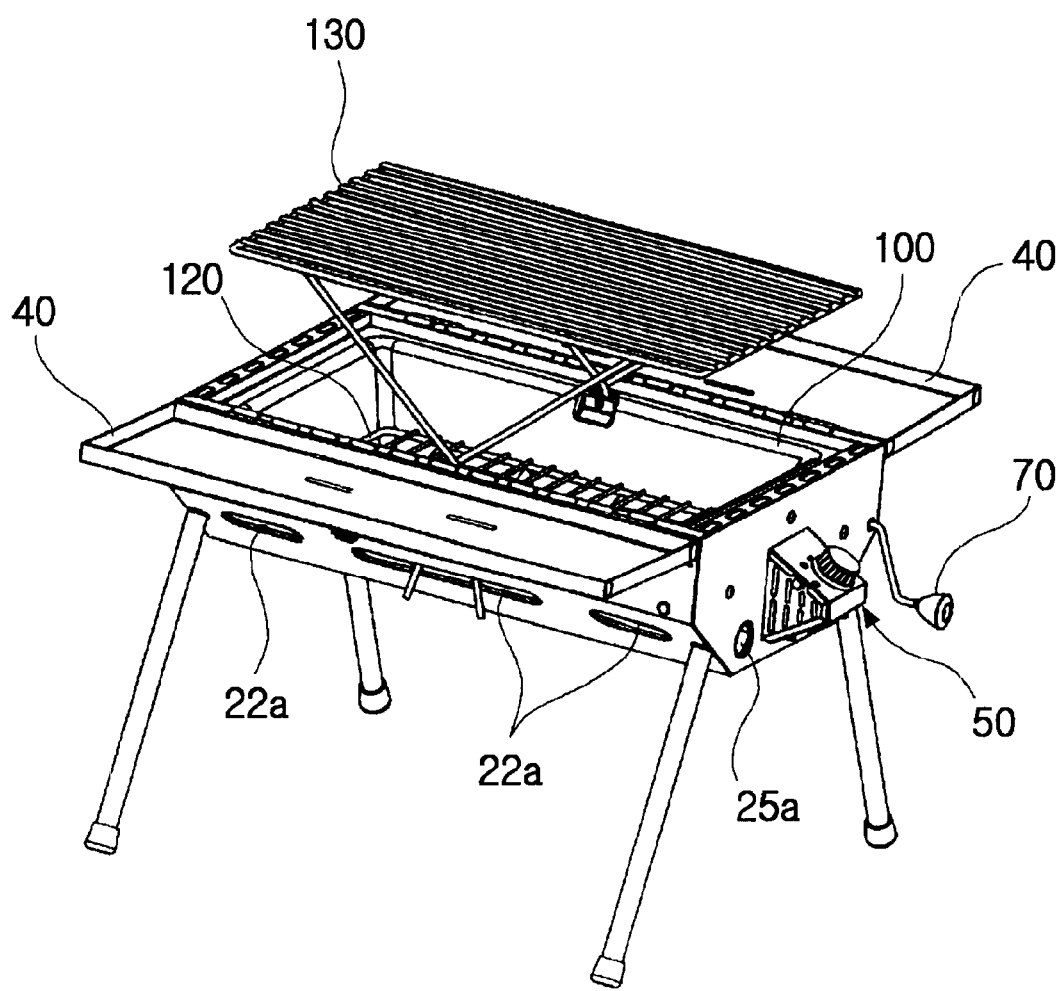
FIG. 4 shows a perspective view of the charcoal cooker shown in FIG. 2, in which a food holder is lifted.
Figure 5:
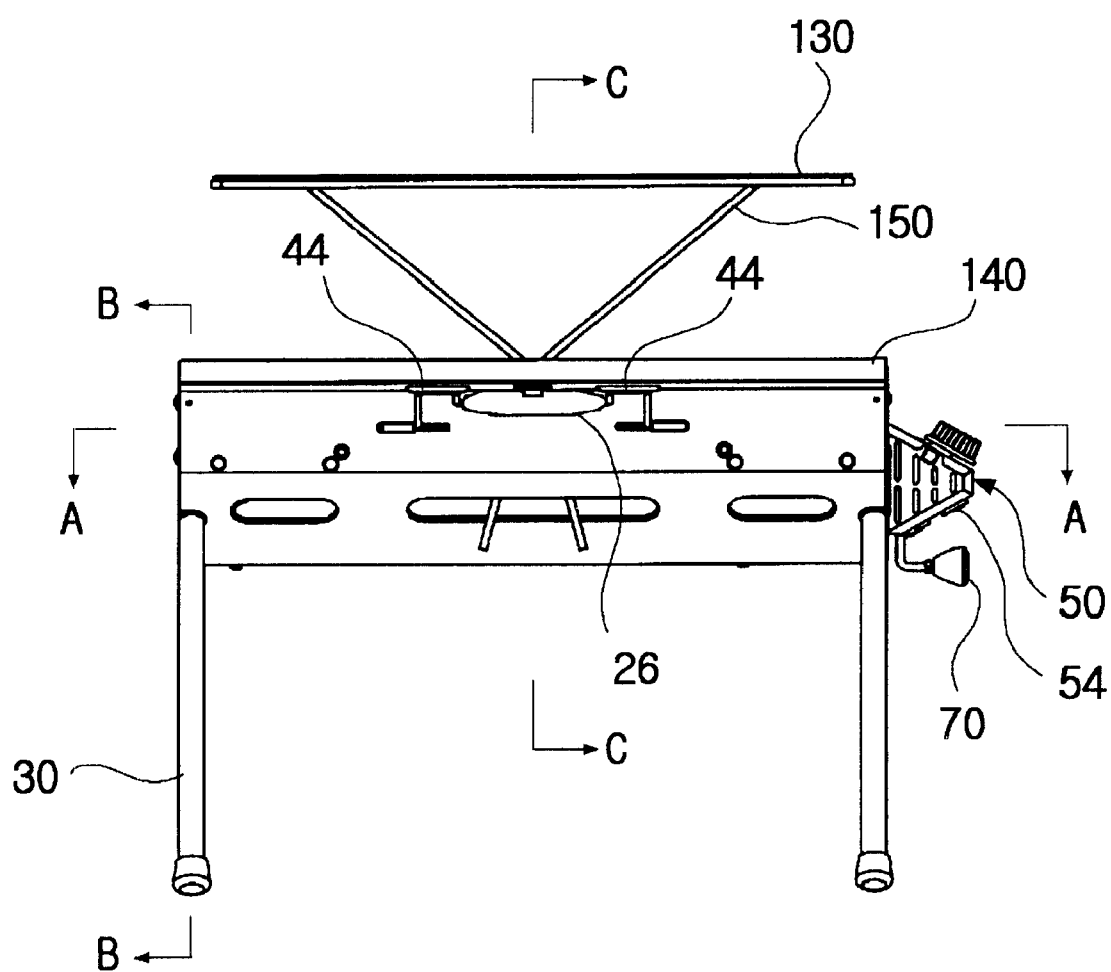
FIG. 5 shows an elevation of the charcoal cooker shown in FIG. 4, viewed in a width direction of a housing.

As shown in FIG. 4, the gas igniter 50 is attached to an outer surface of the first width-directional sidewall 25 of the housing 20. The gas igniter 50 comprises a gas control knob 53 exposed from an upper side thereof and a gas supply part 54 exposed from a lower side thereof. In this embodiment, it is able to make a portable butane gas vessel 200 attached to the gas supply part 54 to supply gas. However, gas used in kindling a charcoal in the charcoal cooker according to the present invention is not limited to the portable butane gas vessel 200, but a supply tube of LPG or LNG for home use may be connected for using LPG or LNG.

Inside of the casing 51 formed with at least an air inlet 51a in the gas igniter 50 is provide with a gas control valve 55 which is capable of being controlled by means of the gas control knob 53, and an port of the gas control valve 55 is provided with a bushing 56 for connecting the mixture gas jet nozzle 90.

Also, one side of the casing 51 is provided with a button 57 for generating igniting spark. When the button 57 is pushed, an electrode 58 arranged near the mixture gas jet nozzle 90 sparks due to electric discharge.

Figure 21:
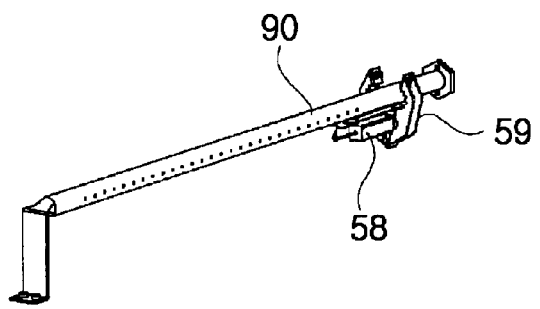
FIG. 21 shows a view similar to FIG. 20 for illustrating how an electrode is kept in place.

An alternative shape of the electrode 58 is shown in FIG. 21. The electrode 58 is elongated with most of the length except the tip coated with a fire-resistant material, and attached underneath the mixture gas jet nozzle 90 in parallel with the mixture gas jet nozzle 90. Attachment of the electrode 58 to the mixture gas jet nozzle 90 is accomplished in aid of a hanger 59. It is preferable that the hanger 59 is shaped in hexagon, in which the hanger 59 is divided into two equivalent parts along a line passing through two opposite corners of the hexagon, and hinged at one of the two opposite corners. The hanger 59 is provided with two holes aligned along the line passing through the two opposite corners of the hexagon. One of the two holes is sized to surround the periphery of the mixture gas jet nozzle 90, while the other of the two holes is sized to surround the periphery of the electrode 58. The two parts of the hanger 59 pivot on the hinged corner so that they are open and closed as pliers (a kind of tool) are. On the opposite corner of the hinged corner, a screwing hole is provided both in the two parts. The electrode 58 is attached to the mixture gas jet nozzle 90 simply by putting the hanger 59 in open around the peripheries of the electrode 58 and the mixture gas jet nozzle 90, closing the two parts of the hanger 59, and then screwing a screw through the screwing hole.

The mixture gas jet nozzle 90 used in the charcoal cooker according to the first embodiment made of a member of hole-punched pipe type of which a front end 91 is sealed, and fixed near the bottom 21 of the housing 20. An end 92 of the mixture gas jet nozzle 90 connected to the gas control valve 55 is punched with an air inlet hole 93. When gas is jetted from the gas control valve 55, air is imported through the air inlet hole 93 due to flow of gas and the imported air is mixed with the jetted gas to form mixture gas. An upper half of the member of hole-punched pipe type constituting the mixture gas jet nozzle 90 is punched with two rows of mixture gas jet holes 94 in a longitudinal direction thereof.

With the charcoal kindling means constructed like such, after the portable butane gas vessel 200 is coupled to the gas supply part 54, rotating the gas control knob 53 makes the gas control valve 55 open and the butane gas is jetted from the mixture gas jet holes 94. In this state, when the button 57 attached to the casing 51 of the gas igniter 50 is pushed, igniting the mixture gas from the mixture gas jet holes 94 is accomplished by means of discharge spark from the electrode 58. If a separate mixture gas jet hole supplying a more rich mixture gas is provided near the electrode 58, the ignition can be more easily accomplished.

In the first embodiment, an example of the mixture gas jet nozzle 90 made of one linear pipe is disclosed, but the mixture gas jet nozzle 90 may be made of two or more linear pipes or a ring-shaped pipe in accordance with the shape and size of the housing 20.

Figure 10:
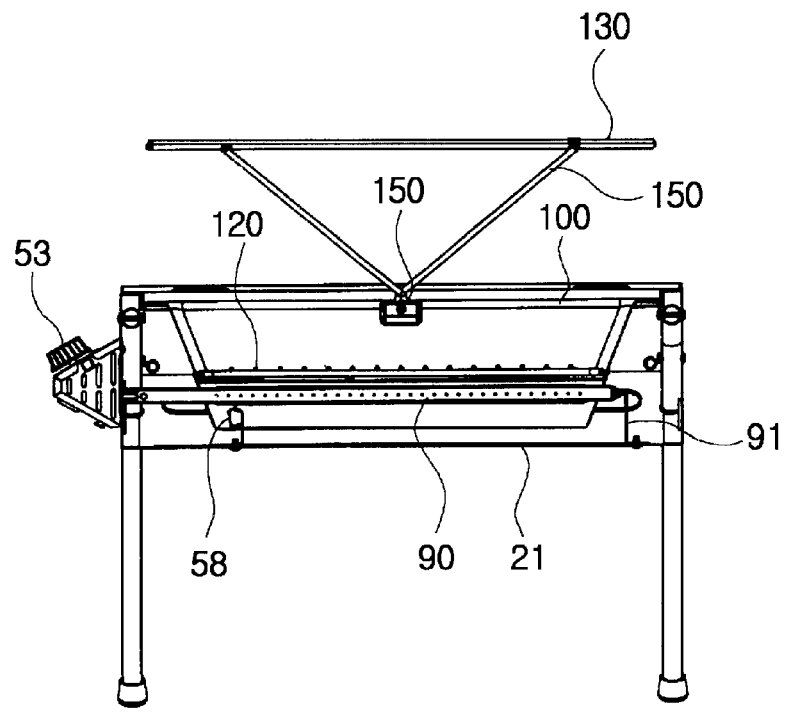
FIG. 10 shows a cross-sectional view of the charcoal cooker, taken along a line D—D of FIG. 7.
Figure 11:
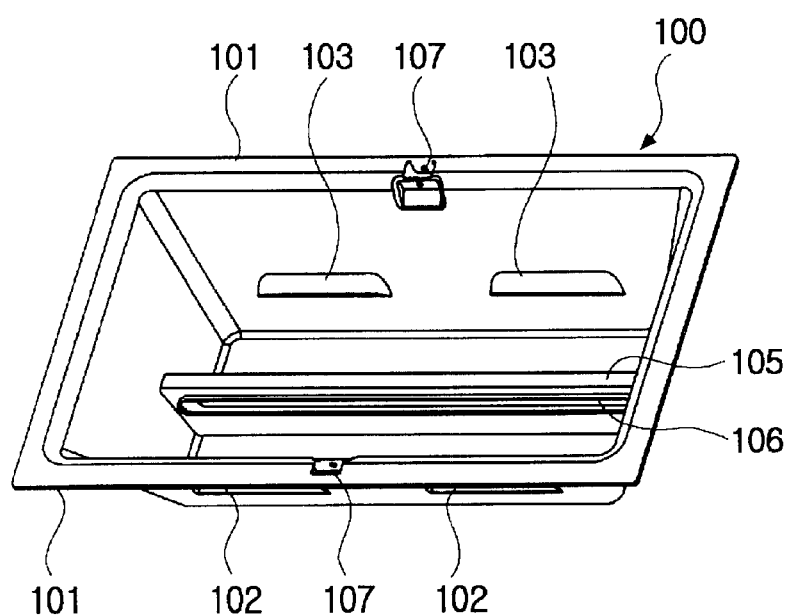
FIG. 11 shows a perspective view of an inner dish built in a housing of the charcoal cooker shown in FIG. 1.
Figure 12:
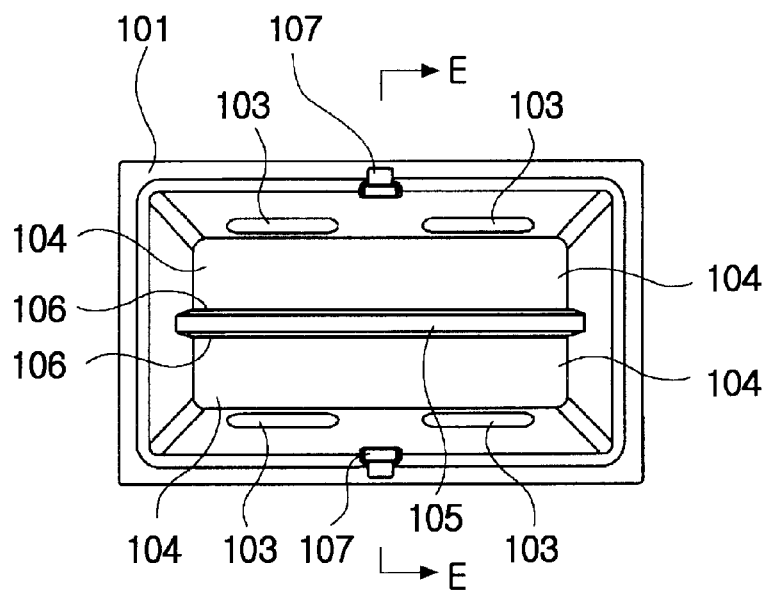
FIG. 12 shows a plan of the inner dish shown in FIG. 11.
Figure 13:
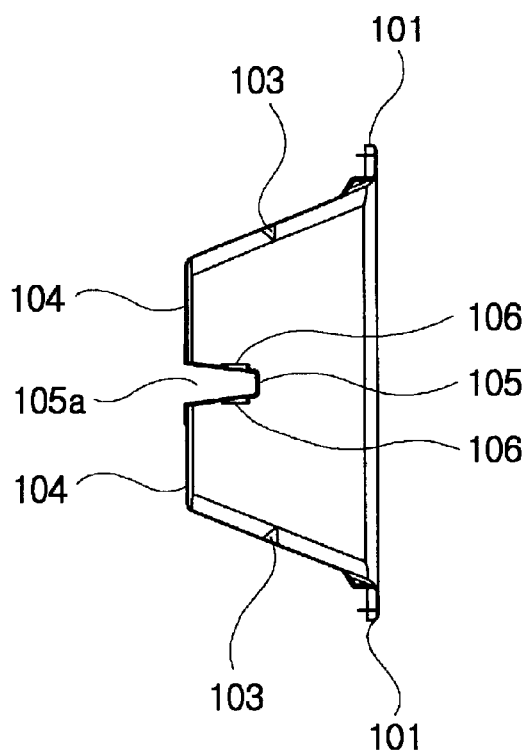
FIG. 13 shows a cross-sectional view of the inner dish, taken along a line E—E of FIG. 12.

On the other hand, in the charcoal cooker according to the first embodiment, as shown in FIG. 9 and 10, the inner dish 100 which is able to be separated from or equipped in the inside of the housing 20 is provided. In FIG. 11 through 13, a construction of such inner dish 100 is shown concretely.

The inner dish 100 is fundamentally provided for facilitating cleaning after using the charcoal cooker by receiving filth such as ashes or oil remains. The inner dish 100 has a top shaped substantially in rectangle, and edges thereof are formed with a flange 101 for preventing deformation thereof and facilitating support thereof. The flange 101 is supported by projections 27 formed on the inner surfaces of the first longitudinal sidewall 22 and the second longitudinal sidewall 23 of the housing 20 so that the bottom of the inner dish 100 is spaced from the bottom of the housing 20. At least an air inlet 102 permitting air to flow from outside to inside of the inner dish 100 are formed in the longitudinal sidewalls of the inner dish 100. The air inlet 102 can be formed by means of forming a horizontal slit on the sidewall of the inner dish 100 and then deforming the upper side of the slit to be projected to inside of the inner dish 100. The deformed upper side of the slit serves as an eaves 103 covering the air inlet 102. That is, when viewed in a profile, the air inlet 102 is open to permit free flow of air, but when viewed in a top, the air inlet 102 is covered with the eaves 103 so that the eaves 103 prevent the fallen filth from getting out of the inner dish 100 through the air inlet 102.

A bank 105 is projected upward on the bottom of the inner dish 100 along the longitudinal centerline thereof. When viewed from outside of the inner dish 100, a portion formed with the bank 105 is a groove 105*a* throughout the length of the inner dish 100. When the inner dish 100 is safely received within the housing 20, the mixture gas jet nozzle 90 is arranged in a space formed by the groove 105*a*. The flame from the mixture gas jet holes 94 of the mixture gas jet nozzle 90 is introduced into the inner dish 100 through slots 106 formed on both sloped surfaces of the bank 105 of the inner dish 100 to kindle a charcoal.

It is preferable that the inner dish 100 is made of a high heat-resistive, corrosion-resisting and endurable material such as stainless steel or an enameled sheet metal.

In order to facilitate washing of filth such as oil remains, it is preferable that a little of water is contained in the inner dish 100 in use. Therefore, it is preferable that the inner dish 100 is waterproofed a lower portion than the air inlet 102 and the slot 106.

Figure 14:
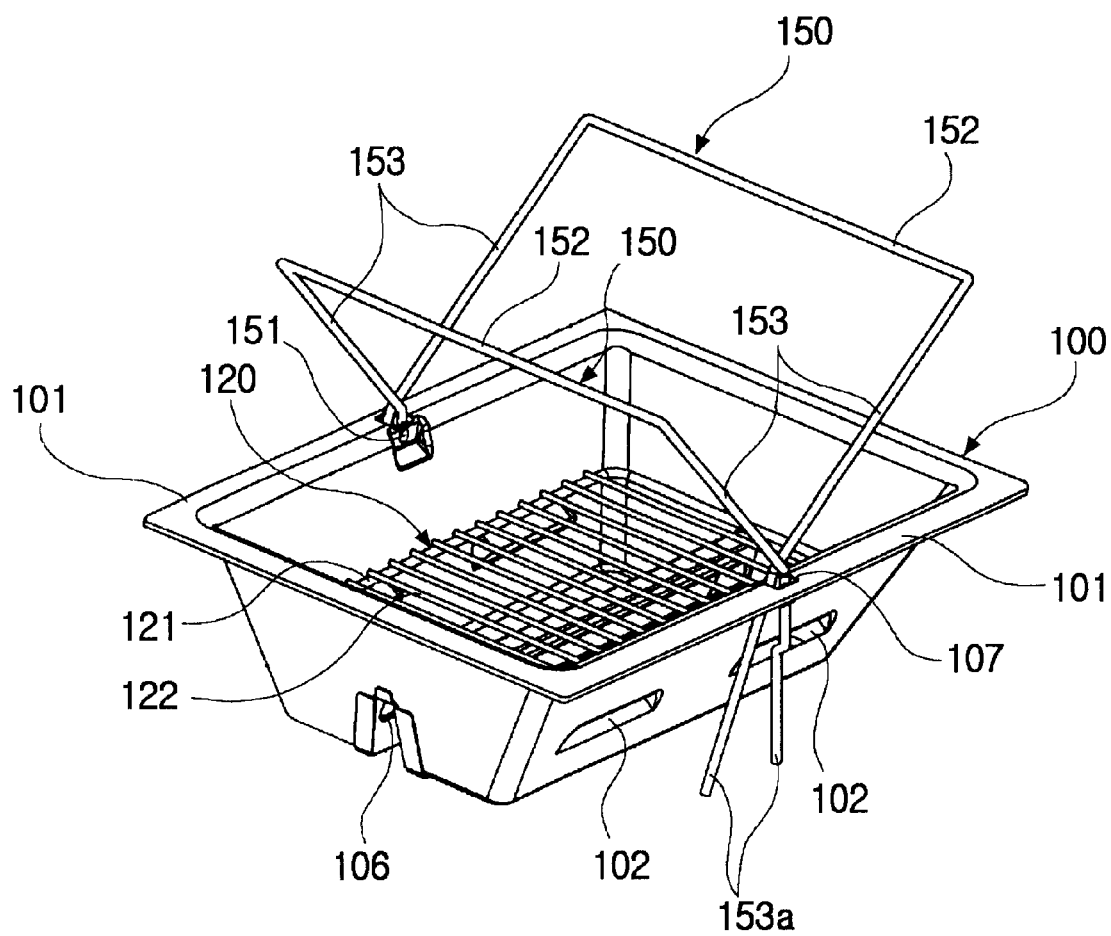
FIG. 14 shows a view of the inner dish shown in FIG. 11 for illustrating how a fuel rack and a support rod are installed thereon.

The fuel rack 120 for charcoal to be put thereon is received within the inner dish 100. The fuel rack 120 according to this embodiment, as shown in FIG. 14, is a rectangular iron grid and is supported by the eaves 103 projected from the inner surface of the sidewalls of the inner dish 100. Although the fuel rack 120 shown in FIG. 14 is an iron grid in which wires are arranged only in one direction, in order to use small-sized charcoal as fuel, an iron grid in which wires are crossed in longitudinal and width directions to form small grids may be used.

Figure 15:
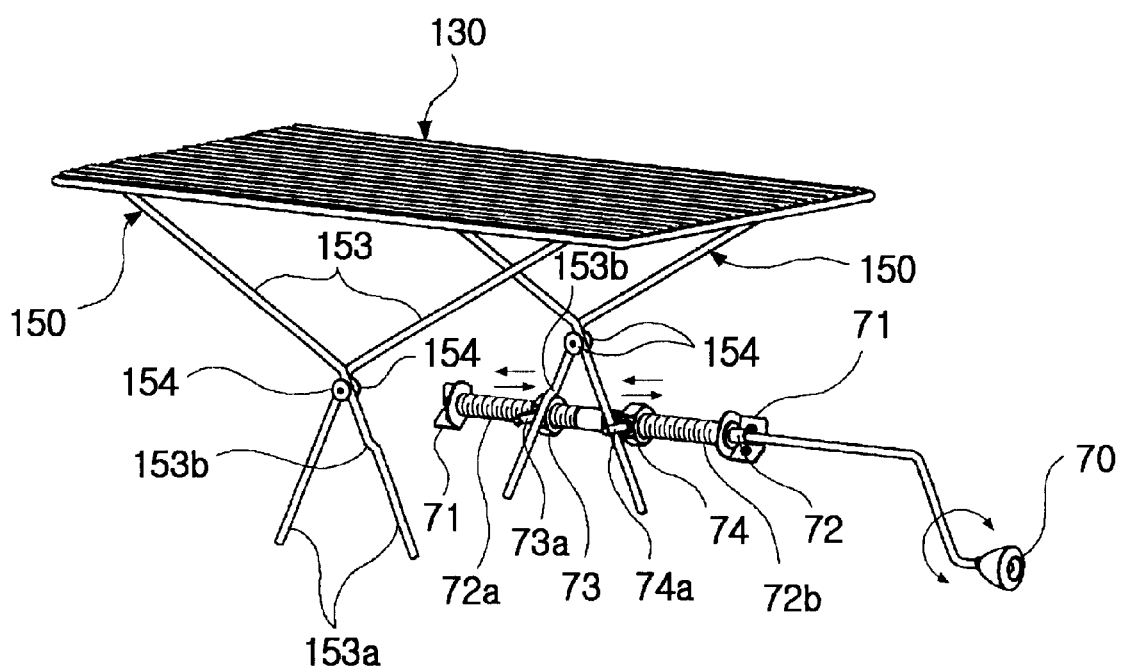
FIG. 15 shows a view of the support rods for illustrating how a food holder lifting means in the charcoal cooker according to the first embodiment of the present invention displace a food holder supported thereon.
Figure 16:
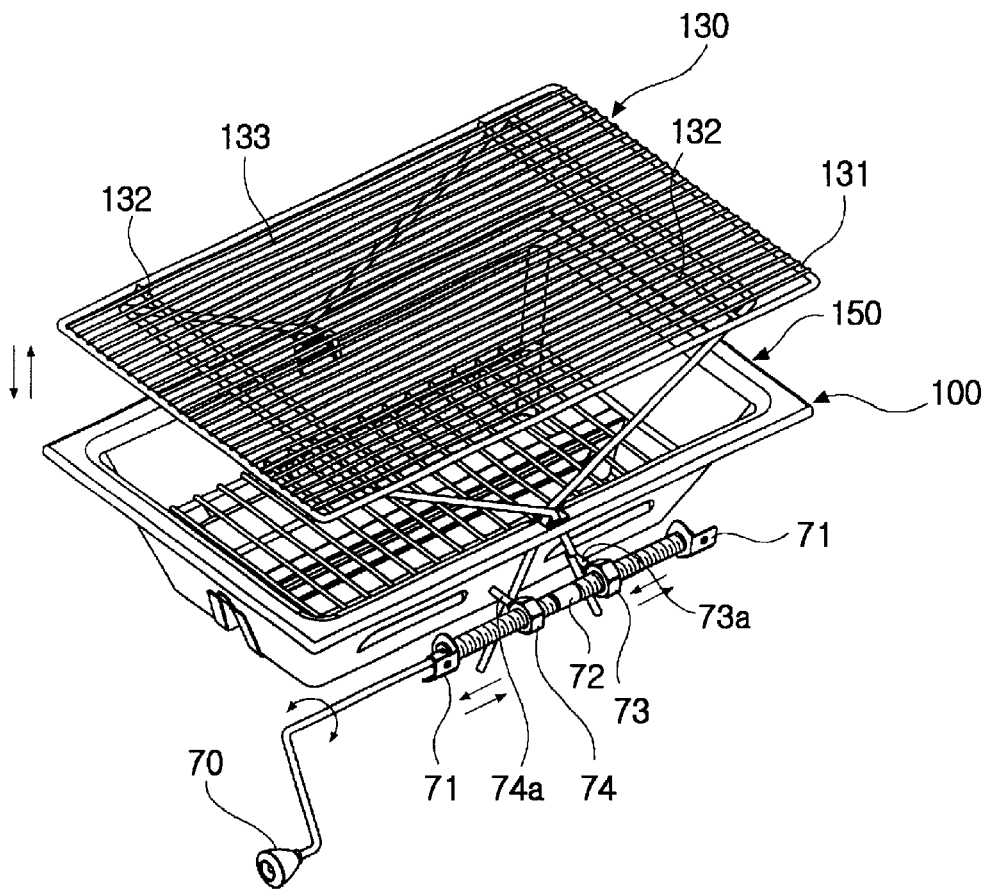
FIG. 16 shows a view similar to FIG. 15 for illustrating how the support rods and the food holder lifting means are installed on the inner dish.
Figure 17:
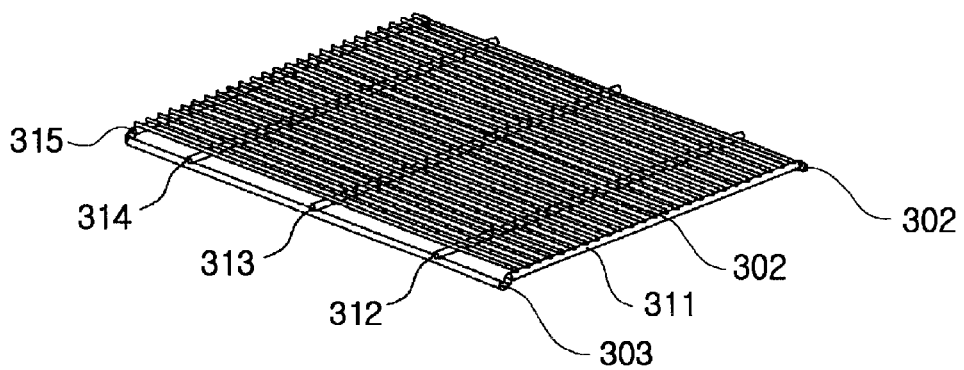
FIG. 17 shows a perspective view of an illustrative iron grid that is suitable to be used with the inventive charcoal cooker.
Figure 18:
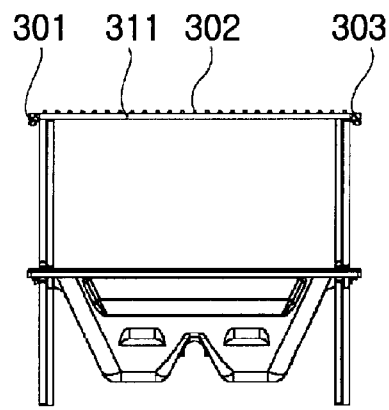
FIG. 18 shows a side view of the iron grid shown in FIG. 17.

The support means for supporting the food holder 130 to be explained later consists of two support rods 150. As shown in FIGS. 15 and 16, two support rods 150 are pivotally assembled to pivot on a pair of pivots 154 at a center of the longitudinal flange 101 of the inner dish 100, respectively. The pivots 154 are constructed by inserting hinge bolts 151 into holes punched at crossing points of the support rods 150. When the support rods 150 are too thin to punch holes, the pivots 154 are constructed by use of hinge rings 154 surrounding two support rods 150 at the crossing points.

A linear rod is arranged in X-axis direction, both end portions of the rod leaving a length similar to the width of the inner dish 100 for a central portion are bended in the Y-axis direction perpendicular to the X-axis direction, and then at least one of both end portions bended in the Y-axis direction is bended toward Z-axis by about 45° at its center, thereby to form a support rod. For the purpose of the convenience of explanation, the central portion in the X-axis direction is referred to as an Z-linear portion 152, the portion bended toward Y-axis is referred to as a Y-bended portion 153 and the portion bended toward Z-axis is referred to as a Z-bended portion 153*a*. Each of the support rods 150 has one X-linear portion 152, two Y-bended portions 153 and at least one Z-bended portion 153*a*.

Two support rods 150 are pivotally coupled to upper portions of the first and the second longitudinal sidewall at the transit portion between the Y-bended portion 153 and Z-bended portion 153*a*, with each other overlapped at the transit portion. Z-bended portions 153*a* of two support rods 150 are biased from each other like scissors. When angle formed between two Z-bended portions 153*a* is reduced, angle formed between two Y-bended portions 153 is increased to make X-linear portions of the support rods 150 go down toward the upper surface of the inner dish 100. On the other hand, when angle formed between two Z-bended portions 153*a* is increased, X-linear portions of the support rods 150 go up from the upper surface of the inner dish 100. That is, as shown in FIG. 15 and 16, in a state that the food holder 130 is put on the X-linear portions 152 of two support rods 150, as the angle between the Z-bended portions 153*a* is reduced or increased, the height of the food holder 130 gets low or high with respect to the upper surface of the inner dish 100.

As shown in drawings, this embodiment is explained assuming that an iron grid is used as the food holder 130. When the support rod 150 is displaced to move up or down the iron grid, there inevitably exist slip between the X-linear portion 152 of the support rod 150 and the bottom of the iron grid. Such slip provably make the iron grid fail to keep in place, that is, a upward place vertically spaced from the inner dish 100, more critically separate from the X-linear portion 152 and drop to the ground. More critical situation results from a width-directional slip rather than a longitudinal slip. It is preferable that, therefore, an iron grid having means for preventing the iron grid from deviating in the width-direction is selected to use with the inventive charcoal cooker. Such means can be embodied by lowering two longitudinal iron wires positioned at both sides from the other longitudinal iron wires positioned through medium position by a proper height, preferably by about a time of the diameter of the wires. A preferred iron grid as shown FIGS. 17 and 18 comprises a plurality of longitudinal iron wires 301, 302 and 303, and five width-directional iron wires 311, 312, 313, 314 and 315. The iron grid is formed by putting two longitudinal iron wires 301 and 303 in parallel with each other, welding the five width-directional iron wires 311, 312, 313, 314 and 315 to upper peripheries of the two longitudinal iron wires 301 and 303, and welding a plurality of longitudinal iron wires 302 to upper peripheries of the five width-directional iron wires 311, 312, 313, 314 and 315 between the two longitudinal iron wires 301 and 303. In use, the X-linear portion 152 of the support rod 150 slips on the bottom of the iron grid only between a second and a third width-directional iron wires 312 and 313 and between a third and fourth width-directional iron wires 313 and 314, while the two longitudinal iron wires 301 and 303 prevent the iron grid from deviating from the X-linear portion 152 of the support rod 150.

Although explaining the above iron grid that specially manufactured for use with the inventive charcoal cooker, it is aimed neither that the iron grid is considered as a constituent of the inventive charcoal cooker, nor that choice of an iron grid for use with the inventive charcoal cooker is limited to the above iron grid. It is also possible that the inventive charcoal cooker is properly used along with a normal food holder such as a normal vessel and a normal iron grid, which has a substantially planar bottom.

Registries for keeping the food holder in place may be a good solution for the aforementioned deviation problems. The food holder 130 shown in FIG. 16 is an iron grid in which a plurality of rod 133 are longitudinally arranged at an area of which boundary is defined by an outer frame rod 131, and the registries consists of two rods 132 arranged in a width direction near both ends of the outer frame rod. Although the food holder 130 shown in FIG. 16 is an iron grid for roasting meat, the charcoal cooker according to the present invention can be used in cooking various foods by use of various vessels such as a steel plate or a pan as a food holder as well as the iron grid for roasting meat.

Also, in FIG. 15 and 16, a construction of the food holder lifting means according to the first embodiment is illustrated in detail. The food holder lifting means includes a transfer screw 72 for lifting the food holder 130, by controlling the angle between the Z-bended portions 153a of the support rods 150 mentioned above.

Figure 6:
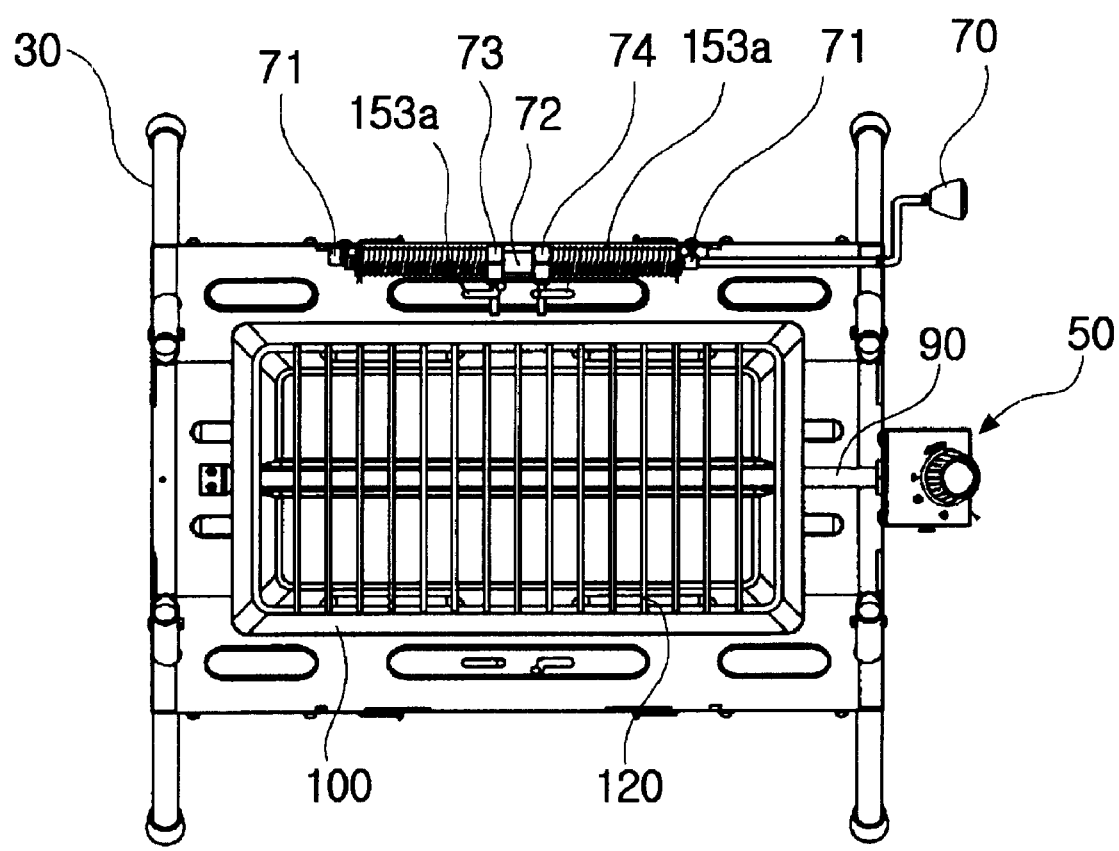
FIG. 6 shows a cross-sectional view of the charcoal cooker, taken along a line A—A of FIG. 5.

As shown in FIG. 6, both ends of the transfer screw 72 are supported to be free to rotate by two brackets 71, two brackets 71 being fixed to the second longitudinal sidewall 23 of the housing 20. An outer surface of the transfer screw 72 according to this embodiment is formed thereon with screw threads which are oppositely directional with respect to the center. That is, a first portion 72a of the transfer screw 72 is left-threaded and a second portion 72b of the transfer screw 72 is right-threaded. One nut block 73 or 74 is inserted onto the first and second portions 72a and 72b of the transfer screw 72, respectively. The nut blocks 73 and 74 cannot be rotated and are constructed to move only in the longitudinal direction of the transfer screw 72. In this embodiment, rotation stopper means of the nut blocks 73 and 74 are constructed in a way the nut blocks 73 and 74 are formed in polygonal column type and one surface of the polygonal column is closely approached to the inner surface of the second longitudinal sidewall 23 of the housing 20. Also, restriction pins 73a and 74a to respectively engage with the Z-bended portion 153a of the support rods 150 are projected from the outer surface of the nut blocks 73 and 74 and thus the Z-bended portion 153a of the support rods 150 operates together with movement of the nut block 73 and 74. A shaft of a driving handle 70 exposed from the first width-directional sidewall 25 of the housing 20 is connected to one end of the transfer screw 72.

In using the charcoal cooker 10, the housing 20 may be directly placed on a table or a ground, and may be placed at a height properly spaced from the table or the ground, with at least three legs 30 adhered. In this embodiment, in order to facilitate installation of legs 30, as shown in FIG. 3, a leg holder 31 made of a pipe bended to be substantially C-shaped is fixed on the first width-directional sidewall 24 and the second width-directional sidewall 25, respectively. Since both ends of the leg holder 31 expose a circular hollow of a pipe and as shown in FIG. 1, the housing 20 is spaced from the ground by inserting one leg into four holes, respectively.

Figure 8:
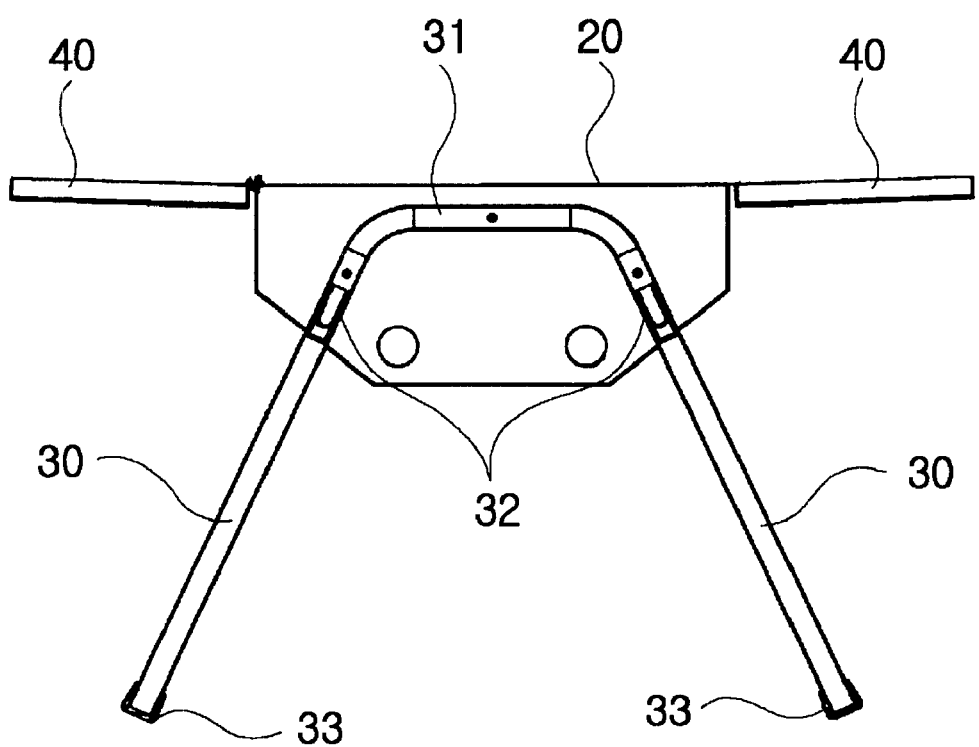
FIG. 8 shows a cross-sectional view of the charcoal cooker, taken along a line B—B of in FIG. 5.

Preferably, a stopper 32 is provided near each insertion end 30a of the legs 30, respectively. The stopper 32 is constructed such that a hemispherical head appears and disappears similarly to the stopper used in a pole of a foldable umbrella. Stopper holes engaging with the head of the stopper 32 of the legs 30 are punched near both ends of the leg holder 31. When the insertion end 30a of the leg 30 is inserted into the hole of the leg holder 31, as shown in FIG. 8, the head of the stopper 32 engages with the stopper hole of the leg holder 31 and thus the leg 30 is held not to be easily unengaged. When the leg 30 is unengaged, pulling the leg 30 with force greater than predetermined force causes the stopper 32 to be pushed and thus the leg 30 is separated.

It is preferable that a resin cap 33 is provided on the opposite end of the leg 30 to the insertion end 30a. Although the legs 30 and the leg holders 31 made of a pipe having a circular cross-section are shown in the drawings, a pipe having a rectangular or polygonal shape may be used.

Also, in the charcoal cooker 10 according to this embodiment, one or more separate pole can be connected to the insertion end 301 of the leg 30 to elongate length of the leg 30. Moreover, it is able to use a leg to be telescopically expanded so that the length of the leg is freely set.

Operation of the food holder lifting means will be explained.

When a driving handle 70 is turned clockwise, two nut blocks 73 and 74 move far away from each other. Accordingly, while a gap between Z-bended portions 153a of two support rods 150 is enlarged, a gap between Y-bended portions 153 is reduced so that the X-linear portions 152 go up from the top of the inner dish 100 and thus the food holder 130 goes up. When the driving handle 70 is turned counterclockwise, two nut blocks 73 and 74 move toward each other. Accordingly, while a gap between Z-bended portions 153a of two support rods 150 is reduced, a gap between Y-bended portions 153 is enlarged, so that the X-linear portions 152 go down toward the top of the inner dish 100 and thus the food holder 130 goes down.

Because two support rods 150 are overlapped at the transit portion between the Y-bended portion 153 and the Z-bended portion 153a, a contact position on the restriction pin 73a where one support rod 150 engages with the Z-bended portion 153a and a contact position on the restriction pin 74a where the other support rod 150 engages with the Z-bended portion 153a is different by a diameter of the support rod 150. The difference between the contact positions may have a bad influence on smooth lifting operation. Therefore, it is preferable that a central portion of the Z-bended portion 153a of one support rod 150 is bended and an axis line of one part of the Z-bended portion 153a engaging with the restriction pin 73a is shifted toward the X-axis by the diameter of the support rod 150 from an axis line of the other part.

Figure 19:
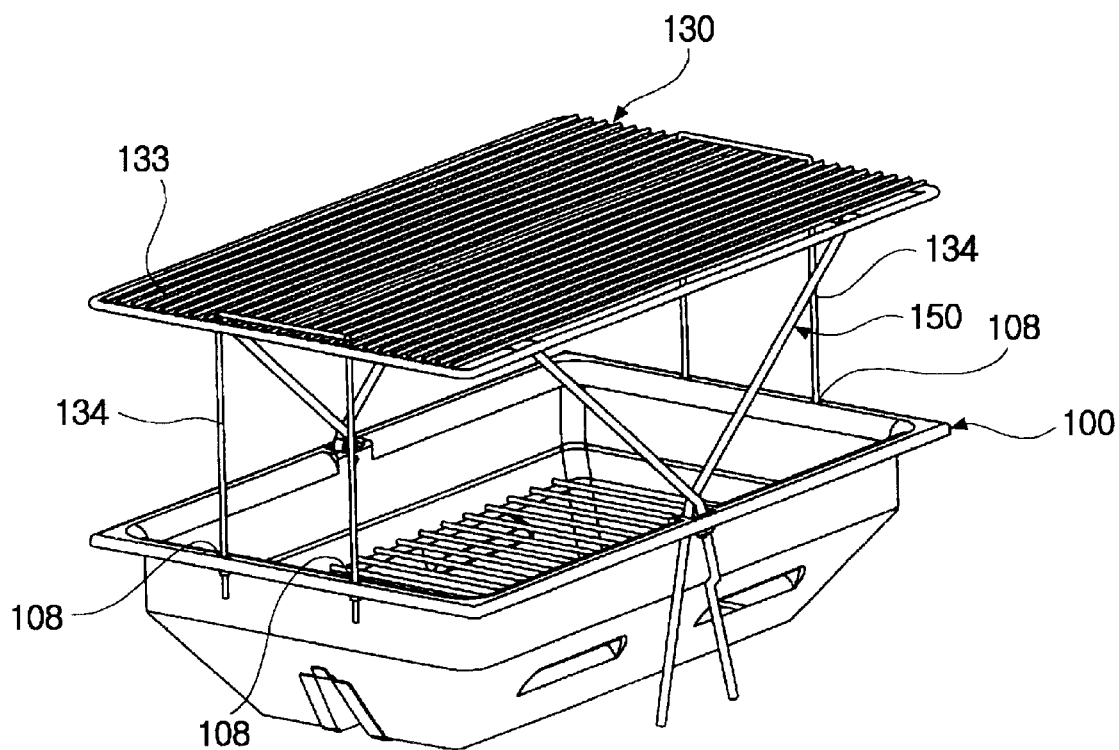
FIG. 19 shows a view similar to FIG. 15 for illustrating guide rods provided to prevent horizontal position of the food holder from varying during displacement of the support rods.
Figure 20:
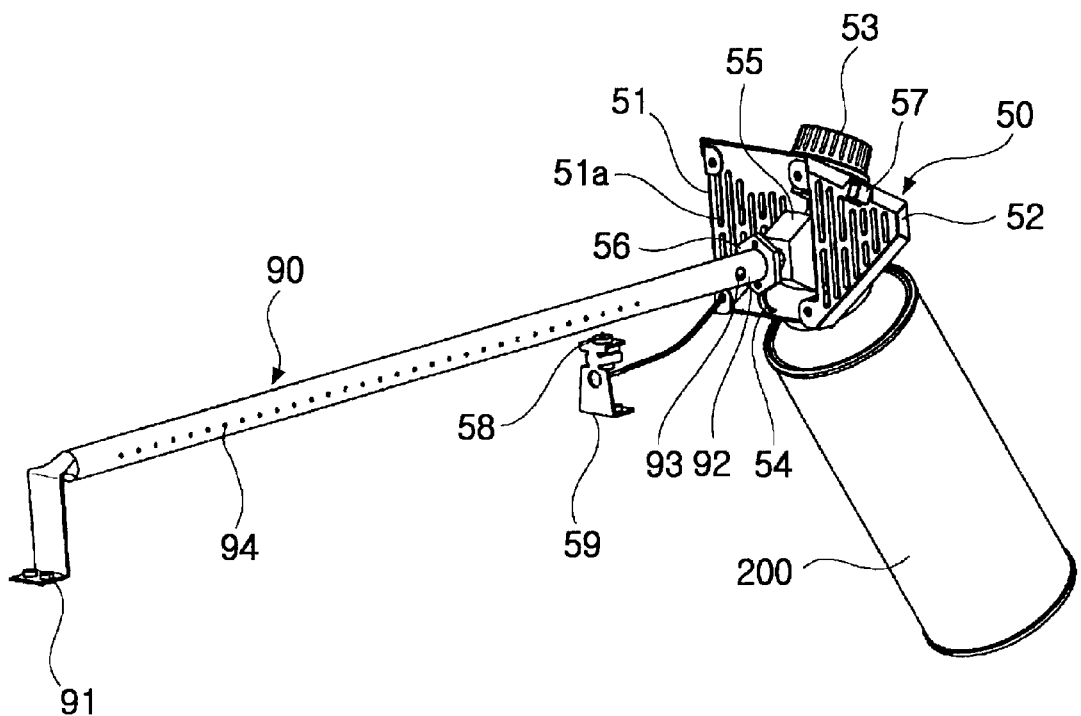
FIG. 20 shows a perspective view of charcoal kindling means used in the charcoal cooker shown in FIG. 1.

In FIG. 19, a horizontal-position-keeper for preventing the food holder 130 from undesirable horizontal shift when the food holder 130 goes up and down is shown. The horizontal-position-keeper comprises guide rods 134 bended to form nearly U shape. The guide rods 134, as shown in FIG. 13, are inserted into holes 108 punched in a width-directional flange 101 of the inner dish 100 through holes of the food holder 130. When the food holder 130 goes up and down, the guide rod 134 goes up and down along with the food holder 130 without any resistance. The X-linear portion 152 of the aforementioned support rod 150 does not simply move up and down, but pivots on the pivot 154, that is, moves up and down along with a horizontal movement. A horizontal movement components of the X-linear portions 152 of the two support rods 150 are opposite in a direction of movement to each other and have equal speed to each other. However, because the coefficient of friction between the X-linear portions 152 of the two support rods 150 and the bottom of the food holder 130 can be partially different from each other, the frictional force in a horizontal direction is not cancelled completely and thus horizontal shift of the food holder 130 can occur when the food holder 130 goes up and down. When the guide rods 134 are inserted, the guide rods 134 suppress the horizontal movement of the food holder 130. That is, the guide rods 134 of this embodiment are constructed to permit the vertical movement and suppress the horizontal movement of the food holder 130.

Now, a method of using the charcoal cooker according to the first embodiment of the present invention will be explained.

When the charcoal cooker 10 according to the first embodiment is in keeping or not in use, the cover 40 is folded and locked by a latch 43 to close the top of the housing 20, the legs 30 are pulled out from the leg holders 31 and kept in the housing 20. The stoppers 32 facilitate equipment and separation of the legs 30.

When the charcoal cooker 10 is in use, the legs 30 are provided to support the housing 20 and the latch 43 is unlocked to make the cover 40 unfolded. Then, appropriate amount of fuel (charcoal) is put on the fuel rack 120 and the portable butane gas vessel 200 is connected to the gas igniter 50.

In unfolding the cover 40, a horizontal part 26a of the carrying handle 26 is made to engage with the projection formed on the cover 40 to support the cover 40, thereby to prevent the cover 40 from drooping.

In such state, while the gas control knob 53 is turned to supply gas from the portable butane gas vessel 200, discharge spark is generated from the electrode 58 to ignite the mixture gas jetted from the mixture gas jet nozzle 90.

When the ignition of fuel on the fuel rack 120 is sufficient by maintaining burning of gas for several tens of seconds, the gas control knob 53 is turned to stop gas supply.

Oxygen required for burning is supplied through a plurality of air inlets 102 punched in the inner dish 100 and a plurality of air inlets 22a, 23a, 24a and 25a punched in the sidewalls of the housing 20.

When ignition of fuel is completed, the food holder 130 suitable for cooking is put on the support rods 50 and then a user can start cooking.

When heating power applied to the food holder 130 in cooking is too intensive, the food holder 130 can go up by means of control of the driving handle 70 of the food holder lifting means to separate the food holder 130 from the fuel rack 120 in the inner dish 100. When heating power applied to the food holder 130 is too weak, the food holder 130 can go down by means of control of the driving handle 70 to make the food holder 130 go toward the fuel rack 120 in the inner dish 100.

The filth such as ashes or food remains generated from cooking is gathered on the bottom 104 of the inner dish 100.

In cleaning after use, the inner dish 100 is pulled out from the housing 20 along with the support rods 150, the filth gathered on the bottom 104 of the inner dish 100 is cleared away and then the inner dish 100, the support rods 150, the food holder 130 and the like is washed with water.

In cooking meat by use of the iron grid as the food holder 130, oil generated from the meat is dropped on the bottom 104 of the inner dish 100. At that time, the inner dish 100 is heated at a very high temperature and thus the dropped oil is evaporated with a repulsive smell emitted, or the dropped oil can be kindled so that the oil can be burned with smoke emitted.

Second Embodiment

Figure 22:
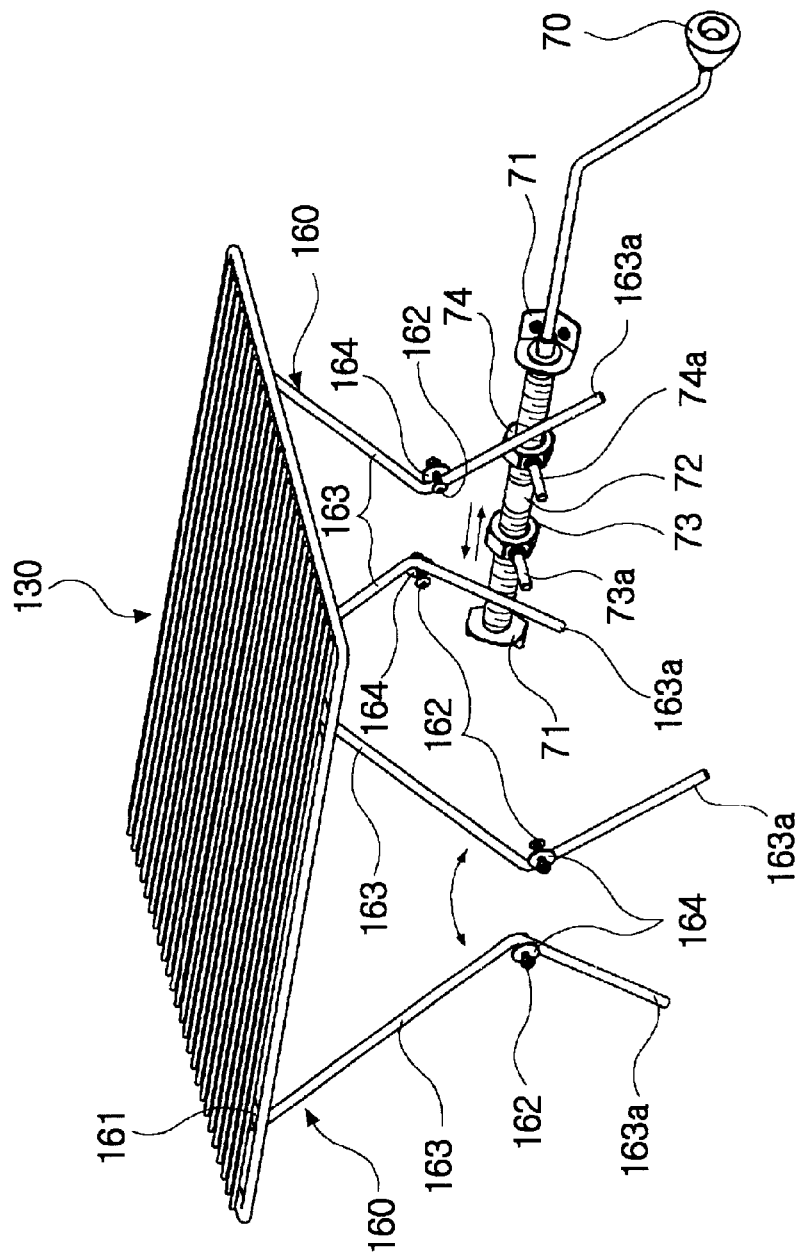
FIG. 22 shows a view illustrating an equipment state of the support rods and operation of the support rods of the charcoal cooker according to a second embodiment of the present invention.
Figure 23:
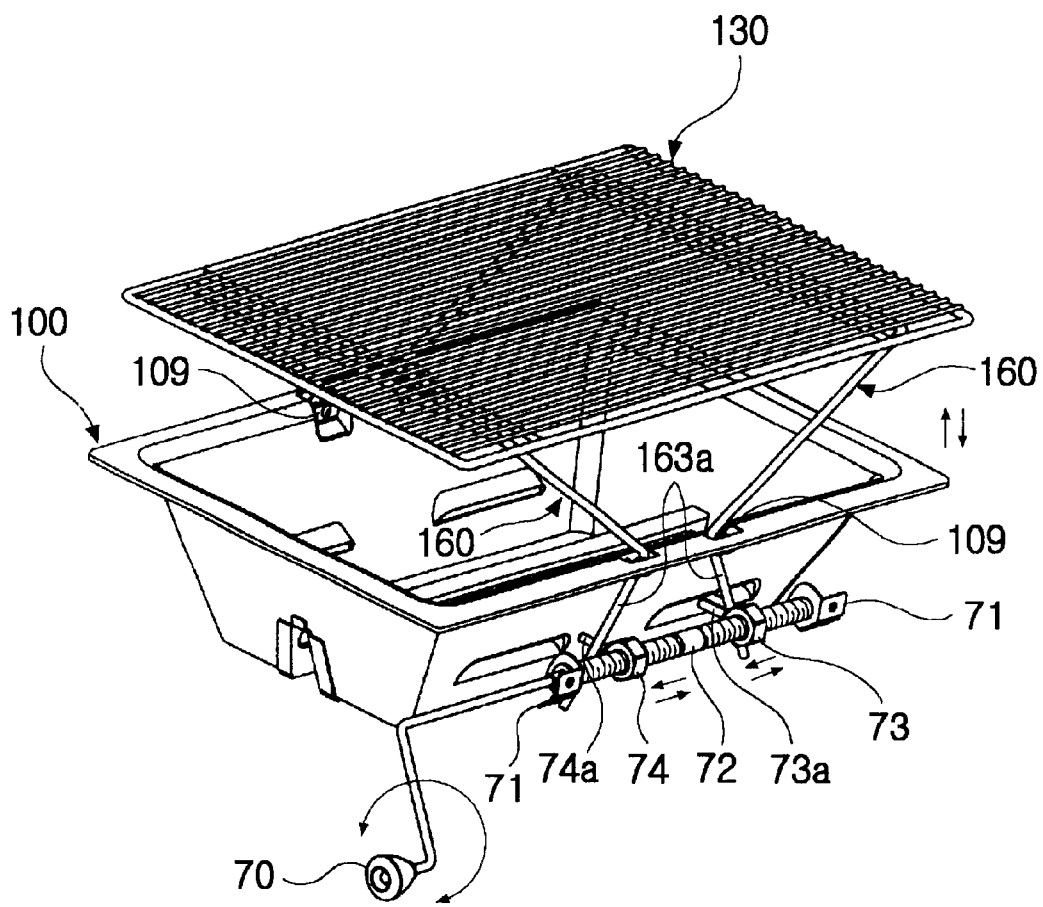
FIG. 23 shows a view illustrating a state where the inner dish is equipped with the support rods, similar to FIG. 22.

FIGS. 22 and 23 show a construction of support rods used in a charcoal cooker according to a second embodiment of the present invention.

The support rods 160 of the charcoal cooker according to the second embodiment are bended in the same way as the support rods 150 of the charcoal cooker according to the first embodiment described above. However, in the first embodiment, two support rods 150 are overlapped at the transit portion between the Y-bended portion 153 and the Z-bended portion 153a and are supported to freely swing on the pivot 154 at the overlapped point, while in the second embodiment, two support rods 160 are not overlapped each other but are arranged separated from each other, and are supported to freely swing on pivots or hinge pins 162, at a transit portion between a Y-bended portion 163 and a Z-bended portion 163a of each support rod 160, respectively. Hinge pins 162 are inserted into hinge rings 164 attached to each transit portion between the support rods 160 and are constructed to pivotally support the support rods 160. Such construction can be used specifically when a diameter of the support rods 160 is small. The construction and the operation of the food holder lifting means are equal to those of the first embodiment.

Third Embodiment

Figure 24:
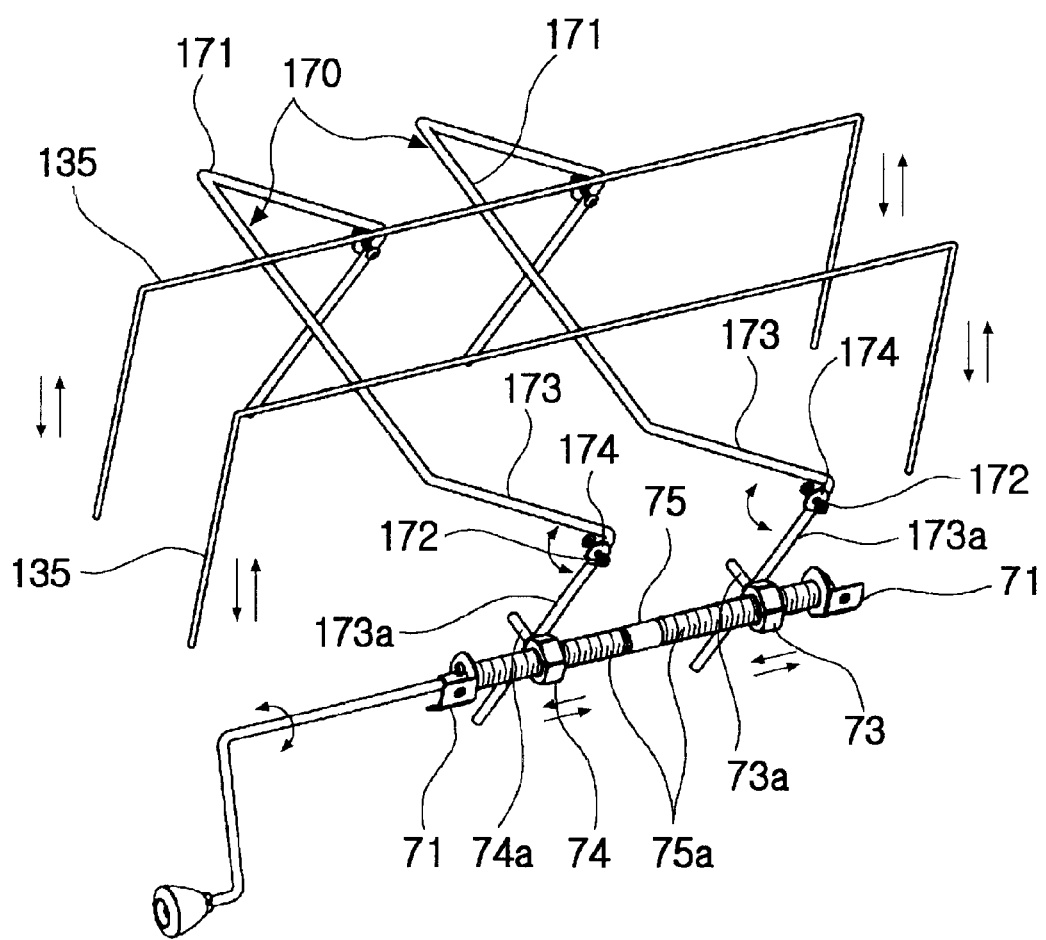
FIG. 24 shows a view illustrating an equipment state of the support rods and operation of the support rods of the charcoal cooker according to a third embodiment of the present invention.
Figure 25:
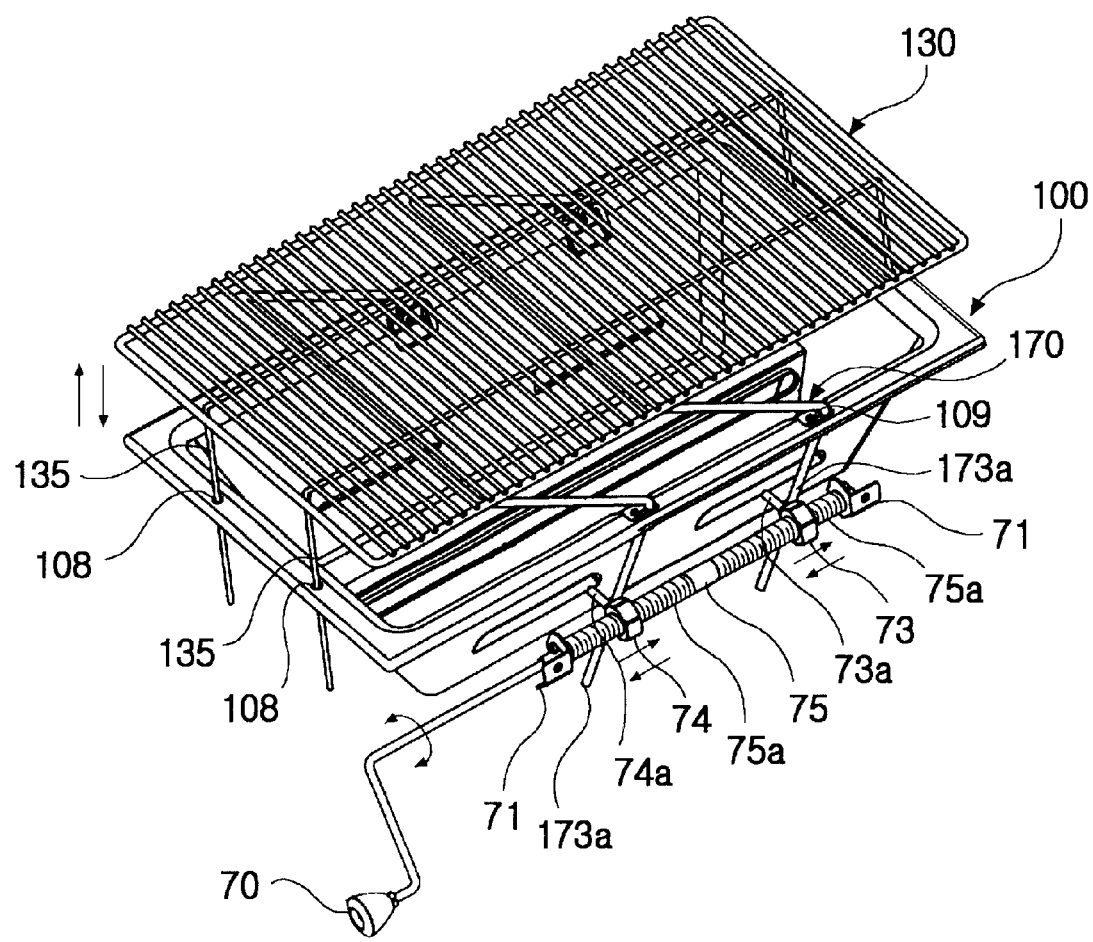
FIG. 25 shows a view illustrating a state where the inner dish is equipped with the support rods, similar to FIG. 24.

FIGS. 24 and 25 show support rods used in a charcoal cooker according to a third embodiment of the present invention.

The support rods 170 of the charcoal cooker according to the third embodiment are bended in the same way as the support rods 160 of the charcoal cooker according to the first and second embodiment described above. Two support rods 170 are not overlapped each other but are arranged separated from each other, and are supported to freely swing on pivots or hinge pins 172, at a transit portion between a Y-bended portion 173 and a Z-bended portion 173a of each support rod 170, respectively. In the third embodiment, in the same way as in the second embodiment, hinge pins 172 are inserted into hinge rings 174 attached to each transit portion between the support rods 170 to pivotally support the support rods 170. However, in the second embodiment, two support rods 160 are arranged in a symmetrical direction, while two support rods 170 according to the third embodiment are arranged in an equal direction. That is, when coupled to the inner dish 100, the Y-bended portion 173 and the Z-bended portion 173a of two support rods 170 is sloped in the equal direction. Accordingly, in the transfer screw 72 of the food holder lifting means according to the third embodiment, screw threads having the same direction are formed on the first portion 72a and the second portion 72b, respectively, unlike the second embodiment in which screw threads having an opposite direction are formed on the first portion and the second portion with respect to a center thereof, respectively. That is, when the transfer screw 72 is rotated in a first direction, two nut blocks 73 and 74 move toward the left side in the drawing, a X-linear portion 171 goes up from the top of the inner dish 100 and thus, the food holder 130 goes up. When the transfer screw 72 is rotated in a second direction, two nut blocks 73 and 74 move toward the right side in the drawing, the X-linear portion 171 goes down toward the top of the inner dish 100 and thus, the food holder 130 goes down.

The X-linear portion 171 of the support rod 170 does not simply move up and down, but pivots on the pivot 174, that is, moves up and down along with a horizontal movement. Namely, when the food holder 130 is directly put on the X-linear portions 171 of the support rods 170, the food holder 130 moves in the right and left direction as well as moves up and down. The movement in the right and left direction causes deviation of centers of the food holder 130 and the charcoal heating part in the inner dish 100.

In the third embodiment, in order to solve such problem, two assistant rods 135 arranged in the longitudinal direction of the inner dish 100 are provided as shown in FIGS. 24 and 25. The assistant rods 135 are bended to form nearly U shape in the same way as the first embodiment, and are inserted into holes 108 punched in a width-directional flange 101 of the inner dish 100. The food holder 130 is not directly put on the X-linear portions 171 of the support rods 170 but is directly put on a horizontal linear portion of the assistant rods 135. The assistant rods 135 are supported at a lower portion of the horizontal linear portion by the X-linear portions 171 of the support rods 170.

In the third embodiment, when the transfer screw 72 is rotated in the first direction, the X-linear portion 171 goes up from the top of the inner dish 100 to push up the assistant rods 135 along with the food holder 130. When the transfer screw 72 is rotated in the second direction, the X-linear portion 171 goes down toward the top of the inner dish 100 and accordingly, the assistant rods 135 are go down along with the food holder 130. At that time, movement in the left and right direction of the X-linear portion 171 of the support rods 170 is absorbed in a relative sliding movement between the X-linear portion and the assistant rods 135 to have no influence on the food holder 130.

Fourth Embodiment

Figure 26:
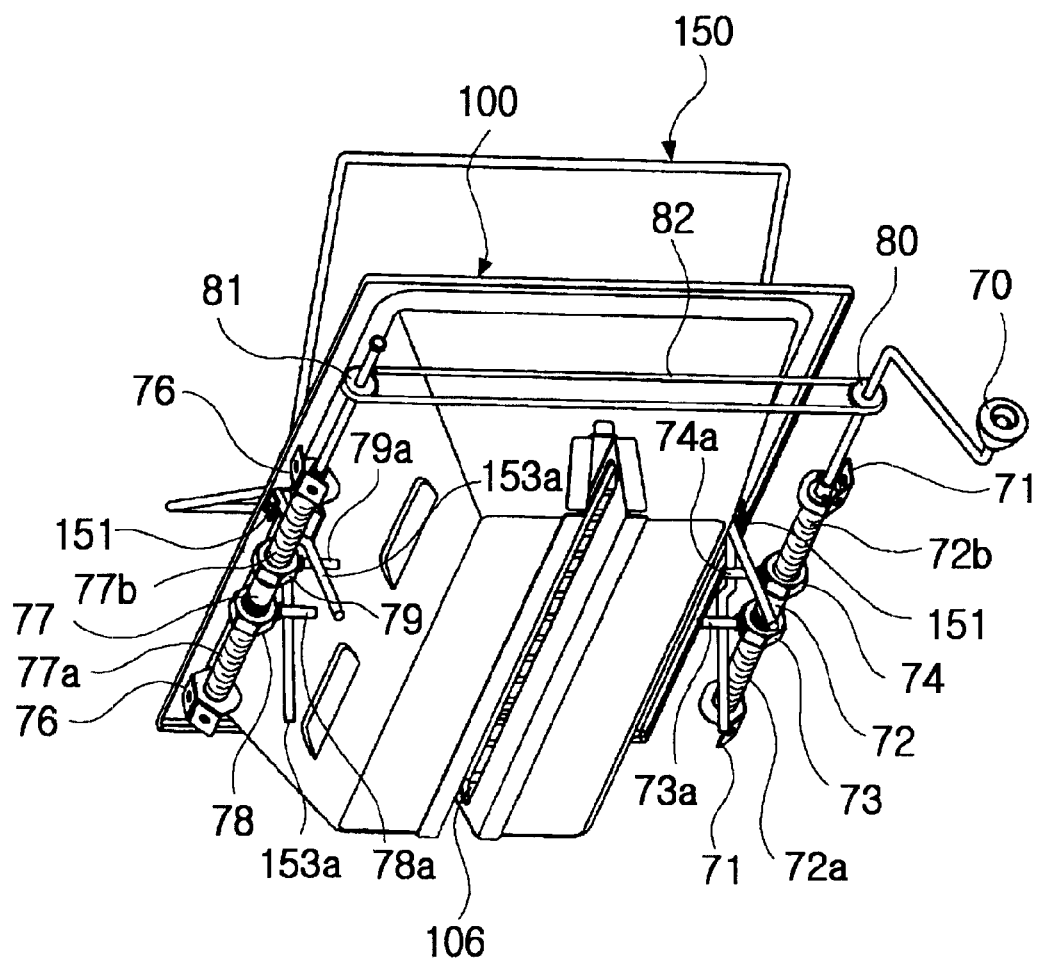
FIG. 26 shows a view illustrating a constitution of the food holder lifting means of the charcoal cooker according to a fourth embodiment of the present invention.

FIG. 26 shows a construction of a food holder lifting means used in a charcoal cooker according to a fourth embodiment of the present invention.

The food holder lifting means according to the fourth embodiment comprises two transfer screws provided one by one to the Z-bended portions 153a of both ends of the support rods 150. A construction of a first transfer screw 72 is equal to that of the transfer screw of the food holder lifting means used in the charcoal cooker according to the aforementioned embodiments, except for that an electric motor means for a second transfer screw 77 is added. A construction of the second transfer screw 77 is equal to that of the first transfer screw 72, except for not comprising the driving handle 70. That is, two brackets 76, a first thread portion 77a, a second thread portion 77b, nut blocks 78, 79 and restriction pins 78a and 79a of the second transfer screw 77 are constructed and operated in the same way as two brackets 71, the first thread portion 72a, the second thread portion 72b, nut blocks 73 and 74 and restriction pins 73a and 74a of the second transfer screw 77, respectively. According to this embodiment, the gearing means transmitting a driving force from the first transfer screw 72 to the second transfer screw 77 consists of a pair of sprockets 80 and 81 fixed one by one to a shaft extended from one ends of the first and the second transfer screw 72 and 77 and an endless circulation type of chain 82 circulating through a determined orbit by means of the sprocket 80 and 81. When the driving handle 70 is rotated, the first and the second transfer screw 72 and 77 is rotated in the same direction at the same time, thereby displacing the Z-bended portion 153a of both ends of the support rods 150 in the same direction at the same time. Force displacing the support rods 150 is applied to both ends thereof in the same direction and with the same strength. Therefore, displacement of the support rods 150, namely movement of the food holder upward and downward is more stable, compared with a case that such force is applied to only one end.

Fifth Embodiment

Figure 27:
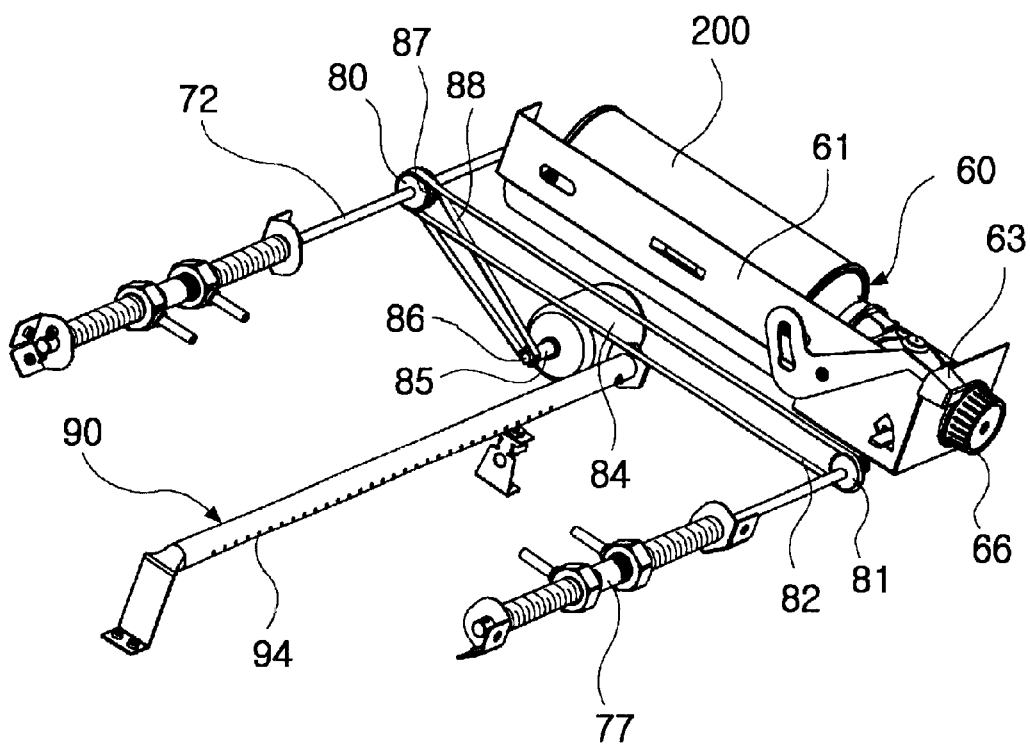
FIG. 27 shows a view illustrating a constitution of the food holder lifting means of the charcoal cooker according to a fifth embodiment of the present invention.

FIG. 27 shows a construction of a food holder lifting means used in a charcoal cooker according to a fifth embodiment of the present invention.

Figure 30:
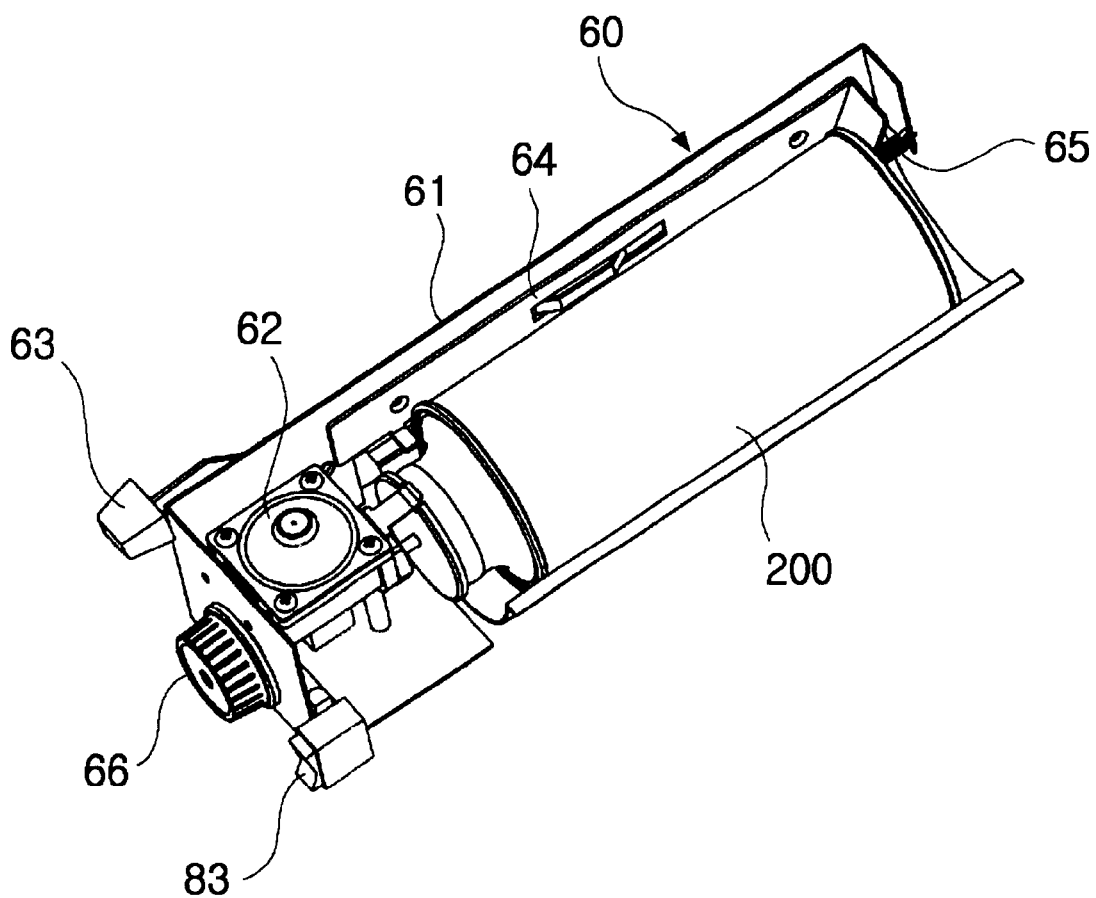
FIG. 30 shows a perspective view of a gas supply part and a gas igniter of the charcoal kindling means shown in FIG. 29, viewed in the width direction.

The food holder lifting means of the charcoal cooker according to the fifth embodiment comprises two transfer screws 72 and 77 in the same way as that of the fourth embodiment, and has the same construction as the food holder lifting means used in the charcoal cooker according to the aforementioned embodiment, except for comprising a driving motor in place of the driving handle 70. The driving motor 84 rotates the first transfer screw 72 by use of a sprocket 86 fixed to the shaft 85, a sprocket 87 fixed to a shaft extended from one end of the first transfer screw 72 and the endless circulation type of chain 82 circulating through the orbit defined by the sprocket 86 and 87. According to the fifth embodiment, as shown in FIGS. 30, an electric switch 83 for controlling the rotating timing and direction of the driving motor 84 is attached to a casing of the gas igniter.

Sixth Embodiment

Figure 28:
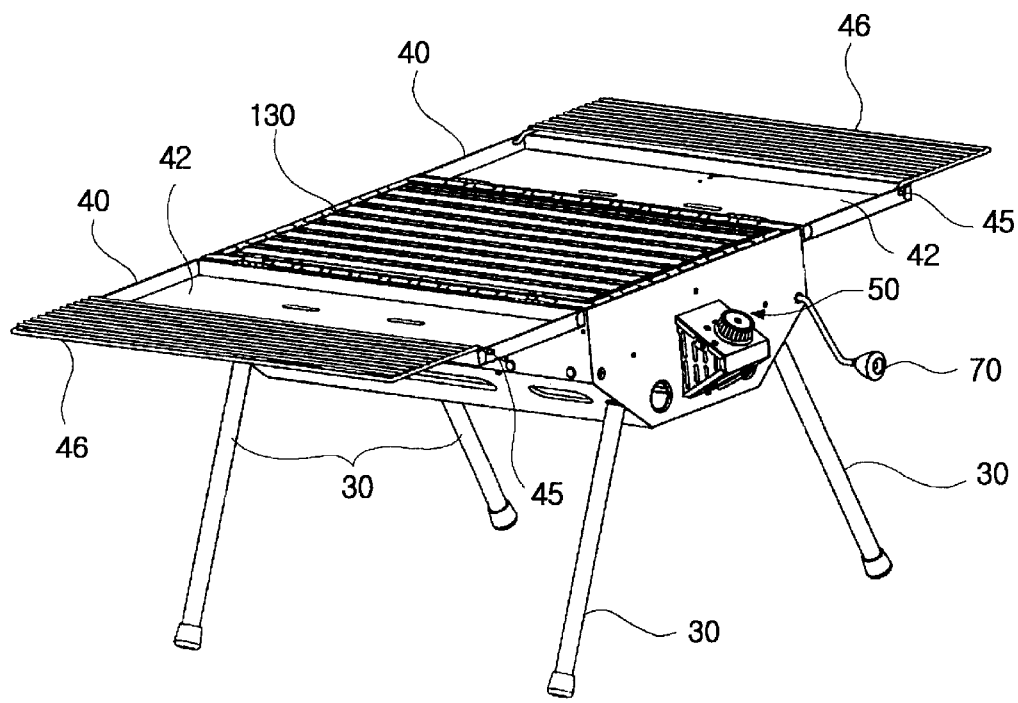
FIG. 28 shows a view illustrating a constitution of the charcoal cooker according to a sixth embodiment of the present invention.

FIG. 28 shows a charcoal cooker according to a sixth embodiment of the present invention.

The construction of the charcoal cooker according to the sixth embodiment is equal to that of the charcoal cooker according to the first embodiment, except for the extension rack 46 is provided in the insides of the first and the second member of the cover 40. Therefore, only the construction of the cover will be explained and the remaining structure will not be explained.

As shown in FIG. 28, a plane grid member is built in insides of the first member and the second member of the cover 40, respectively. The plane grid member is pivotally coupled to the flanges of the first member and the second member of the cover 40 to pivot on a pivot axis passing through a position close to a sidewall thereof, respectively. When the cover is closed, the plane grid member is pivoted and folded to be received in inside of the first member and the second member in contact with the inside of the members. In use, the plane grid member is pivoted to be unfolded toward the outside of the first member and the second member of the cover 40, so that area of a table formed of the first member and the second member of the cover 40 is extended.

Seventh Embodiment

Figure 29:
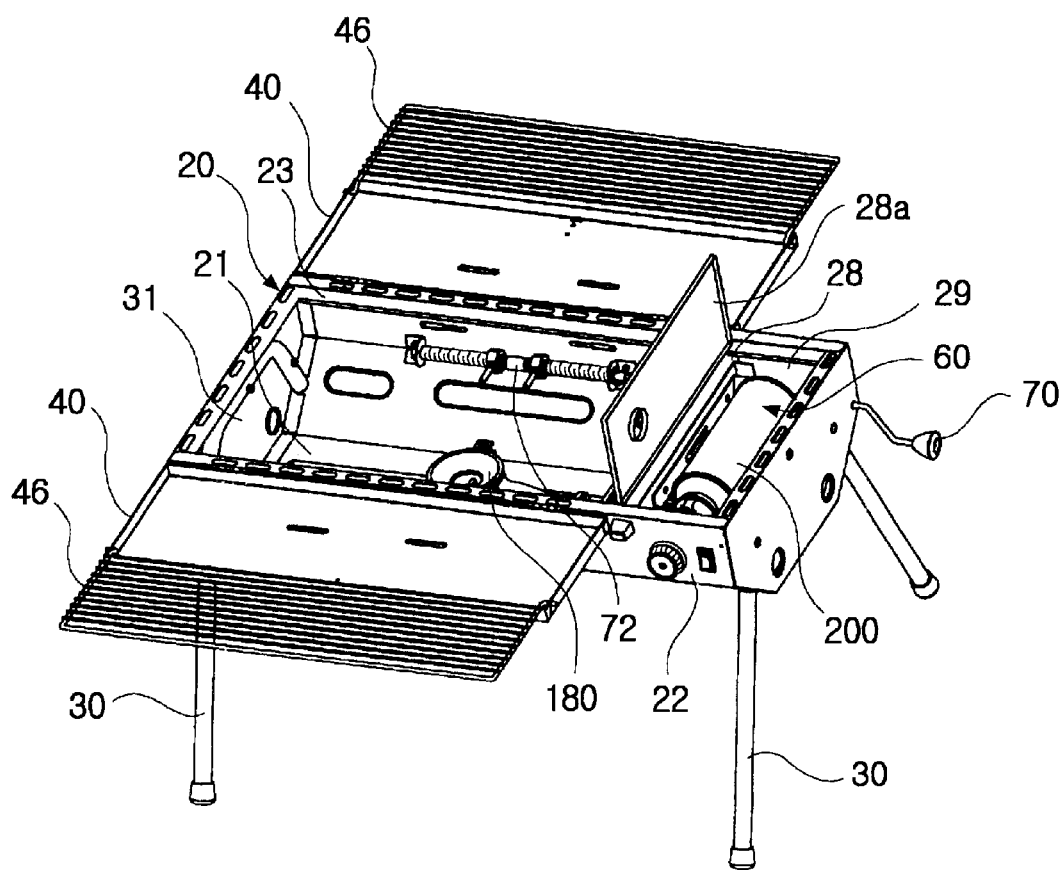
FIG. 29 shows a view illustrating a constitution of the charcoal kindling means according to a seventh embodiment of the present invention.

FIG. 29 shows a construction of a gas igniter used in a charcoal cooker according to a seventh embodiment of the present invention.

Figure 31:
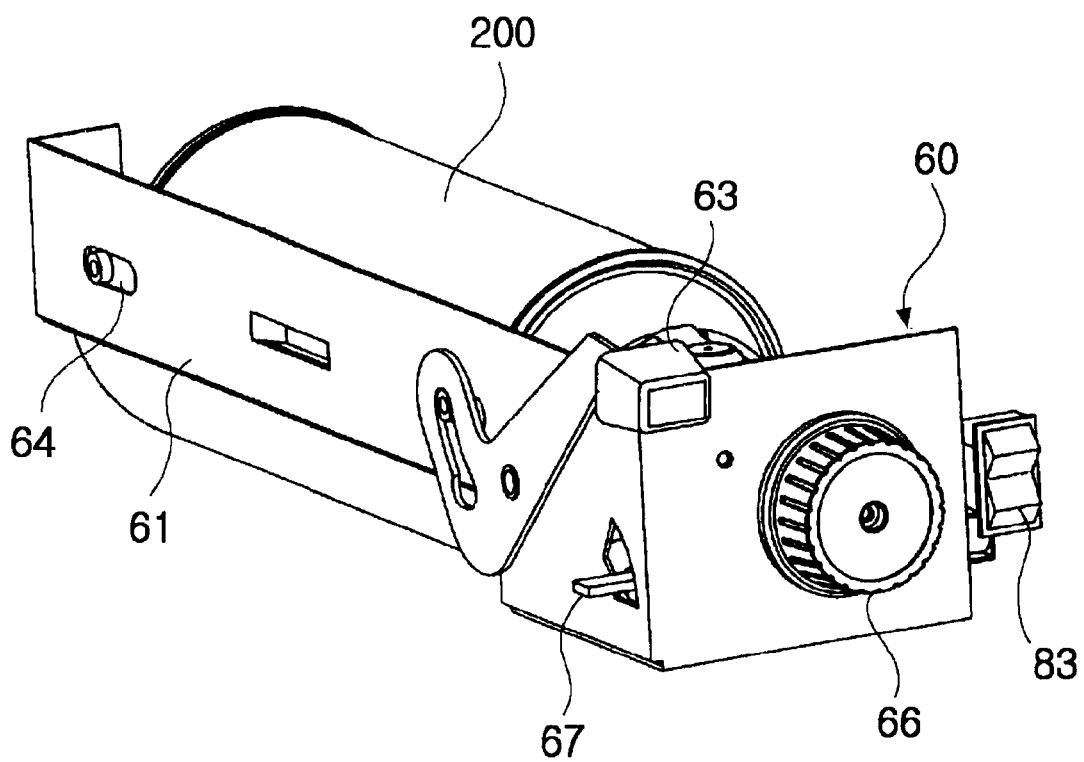
FIG. 31 shows a perspective view of the gas supply part and a gas igniter of the charcoal kindling means shown in FIG. 29, viewed in the longitudinal direction.

As shown in FIG. 29, in the gas igniter of the charcoal cooker according to the seventh embodiment, the gas supply part is received in inside of the housing 20, the gas control knob is exposed from the outside of the housing 20. As shown in FIGS. 30 and 31, the gas supply part according to the sixth embodiment comprises a frame 61 defining a space for receiving the portable butane gas vessel 200, a gas regulator provided at an end of the space defined by the frame 61, an adaptor constructed to connect an outlet of the portable butane gas vessel 200 to the gas regulator 62, a bracket 64 on which the portable butane gas vessel 200 can slide, a lever 63 for sliding the portable butane gas vessel 200 in a direction in which the outlet get close to the adaptor, a return spring 65 for sliding the portable butane gas vessel 200 in a direction in which the outlet get far away from the adaptor, and a safety lever 67 exposed from a side surface of the frame 61. The construction of the gas supply part is equal to that of the gas supply part adopted in a general portable gas stove, and thus, the detailed explanation of the construction and operation thereof will be omitted. In order to receive such gas supply part, a separated space defined by partitions 28 is provided in the housing 20.

Eighth Embodiment

FIGS. 32 through 39 show a mixture gas jet nozzle used in a charcoal cooker according to an eighth embodiment of the present invention.

Figure 35:
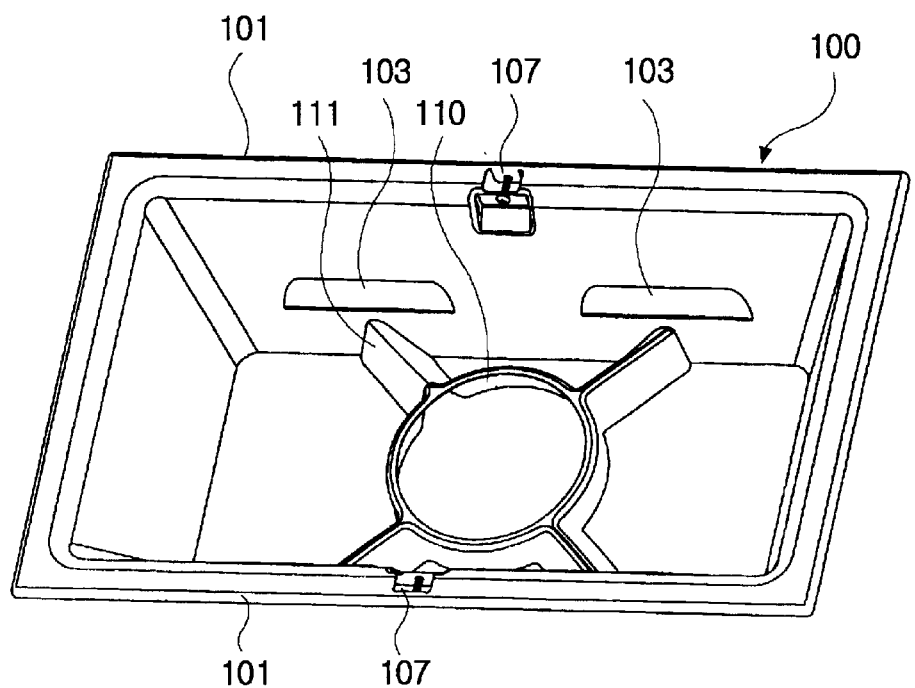
FIG. 35 shows a perspective view of the inner dish-built in the housing of the charcoal cooker shown in FIG. 32.
Figure 36:
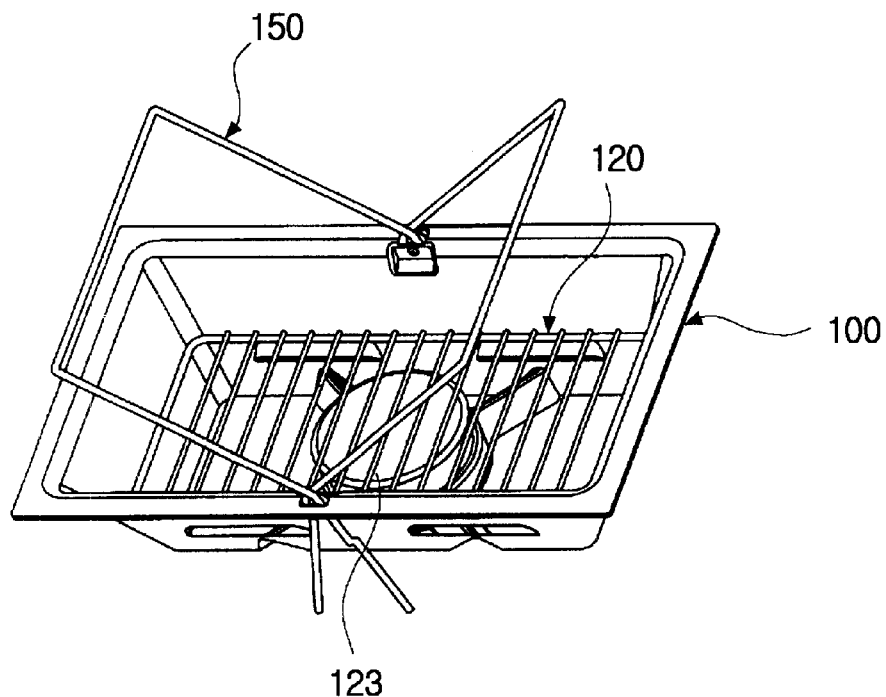
FIG. 36 shows a view illustrating a state where the inner dish shown in FIG. 35 is equipped with the fuel rack and the support rods.
Figure 37:
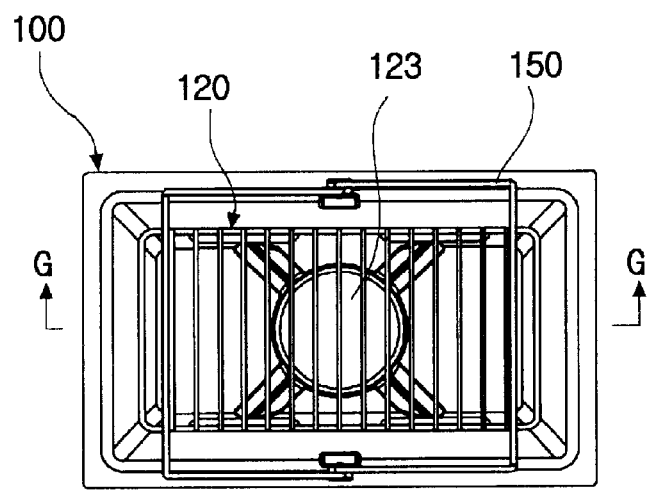
FIG. 37 shows a plan of the inner dish shown in FIG. 36.
Figure 38:
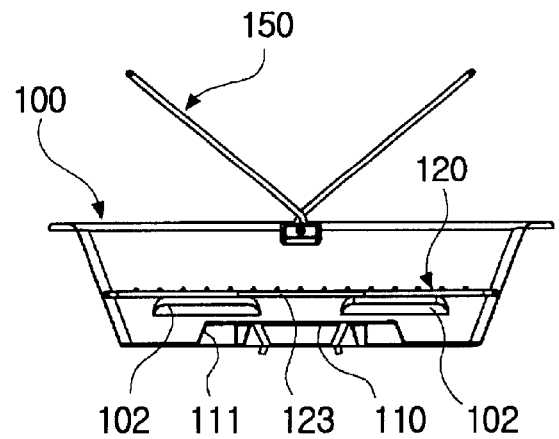
FIG. 38 shows a cross-sectional view of the inner dish, taken along a line G—G of FIG. 37.
Figure 39:
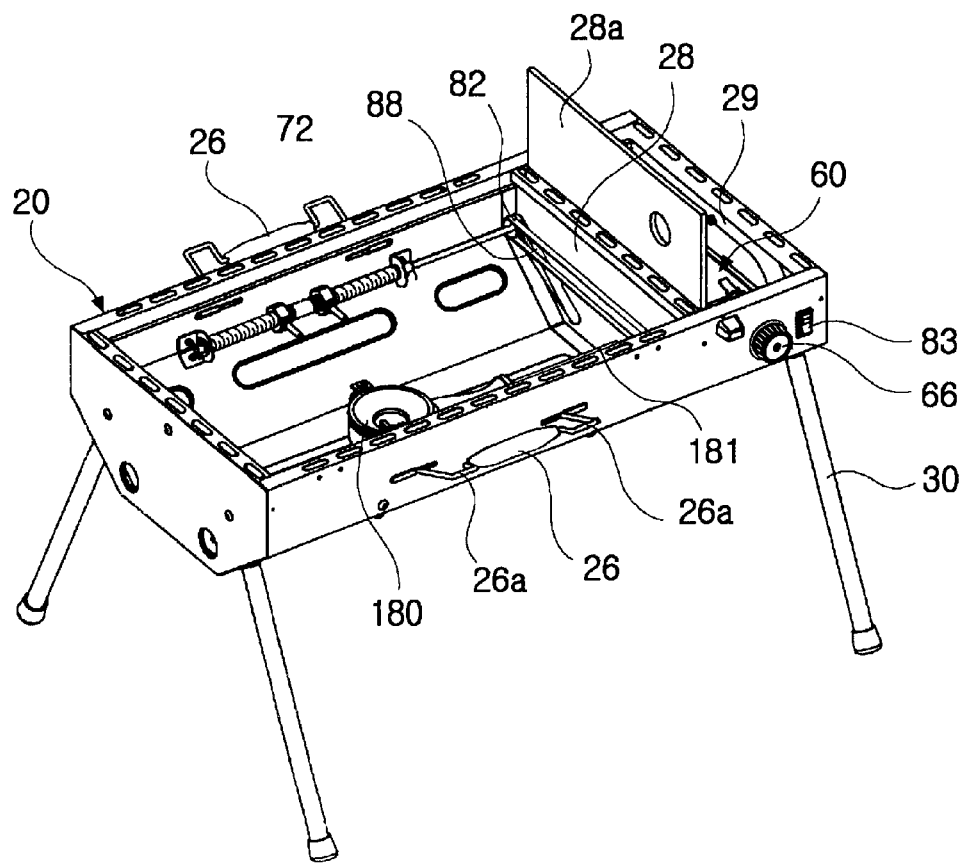
FIG. 39 shows a perspective view of the charcoal cooker shown in FIG. 32, where the inner dish is shown removed.

The charcoal cooker according to the eighth embodiment uses the mixture gas jet nozzle having the same construction as that of circular mixture gas jet nozzle adopted in a general gas stove for home. In order to receive such circular mixture gas jet nozzle 180, the inner dish 100 of the charcoal cooker according to the seventh embodiment have a structure, which the shape of the inner dish of the charcoal cooker according to the first embodiment is partially deformed to. That is, the inner dish 100 of the charcoal cooker according to the eighth embodiment, as shown in FIG. 35, has the same shape as the inner dish of the charcoal according to the first embodiment, except for the shape of the bottom for receiving the mixture gas jet nozzle 180.

Figure 32:
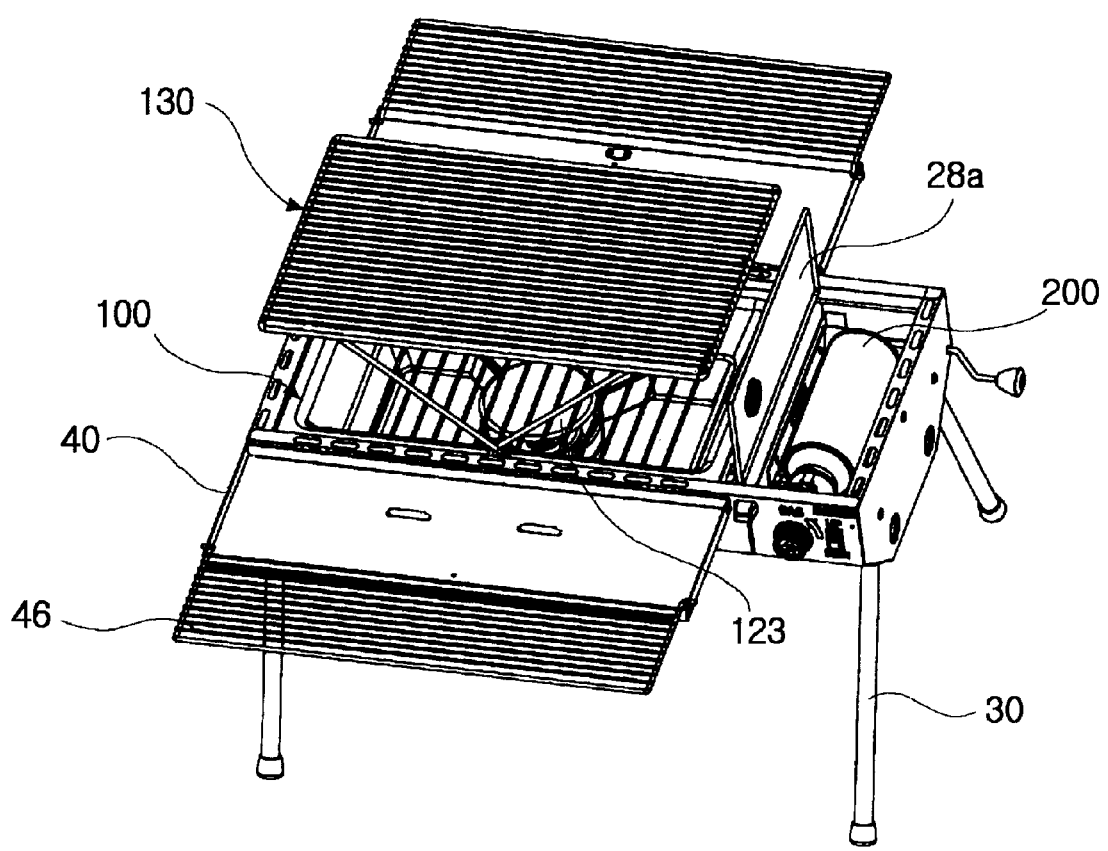
FIG. 32 shows a perspective view of the charcoal cooker according to an eighth embodiment of the present invention, similar to FIG. 4.
Figure 33:
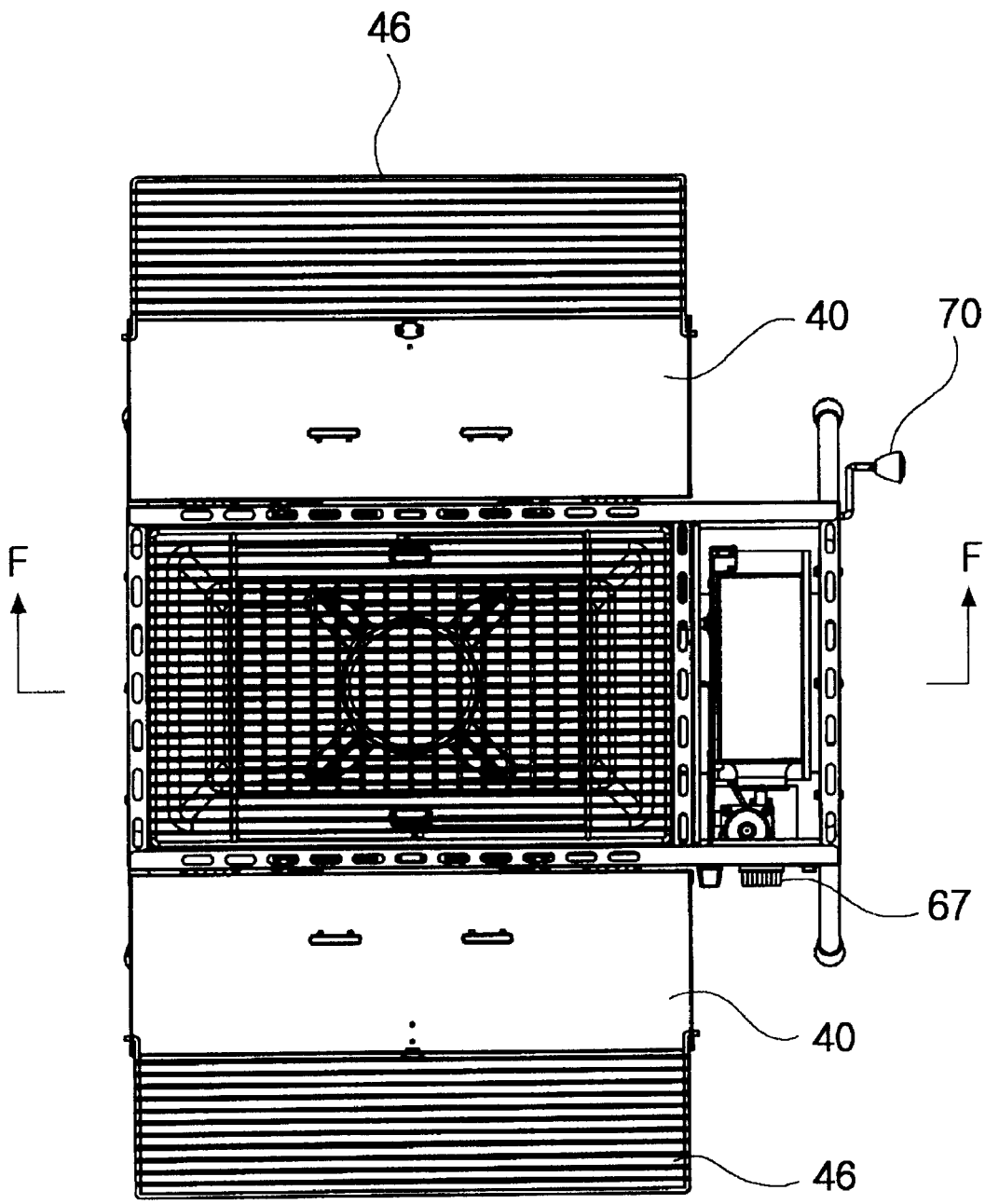
FIG. 33 shows a plan of the charcoal cooker shown in FIG. 32.
Figure 34:
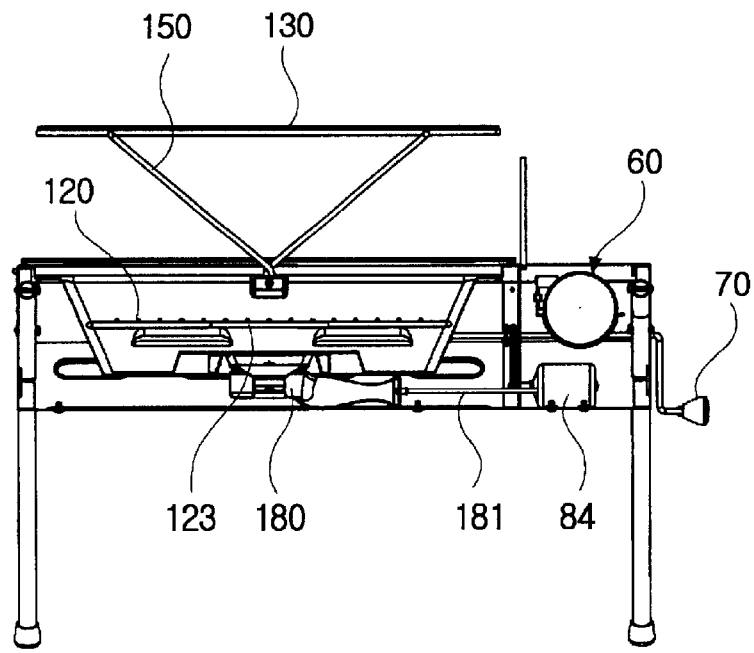
FIG. 34 shows a cross-sectional view of the charcoal cooker, taken along a line F—F of FIG. 33.

A circular opening 110 for receiving the mixture gas jet nozzle 180, is punched at the center of the bottom of the inner dish 100 of the charcoal cooker according to the eighth embodiment and four banks 111 for receiving a 4-legged supporter are formed on the surroundings of the circular opening 110. The banks 111 are constructed in a similar way to the bank 105 of the inner dish 100 of other charcoal cooker according to the embodiments described above. As shown in FIG. 32 and 34, it is preferable that a circular ceiling 123 is provided on the circular opening 110, so that ashes or filth are not directly dropped on the mixture gas jet nozzle 180. In this embodiment, the circular ceiling 123 is attached to a lower surface of the fuel rack 120.

Ninth Embodiment

Figure 40:
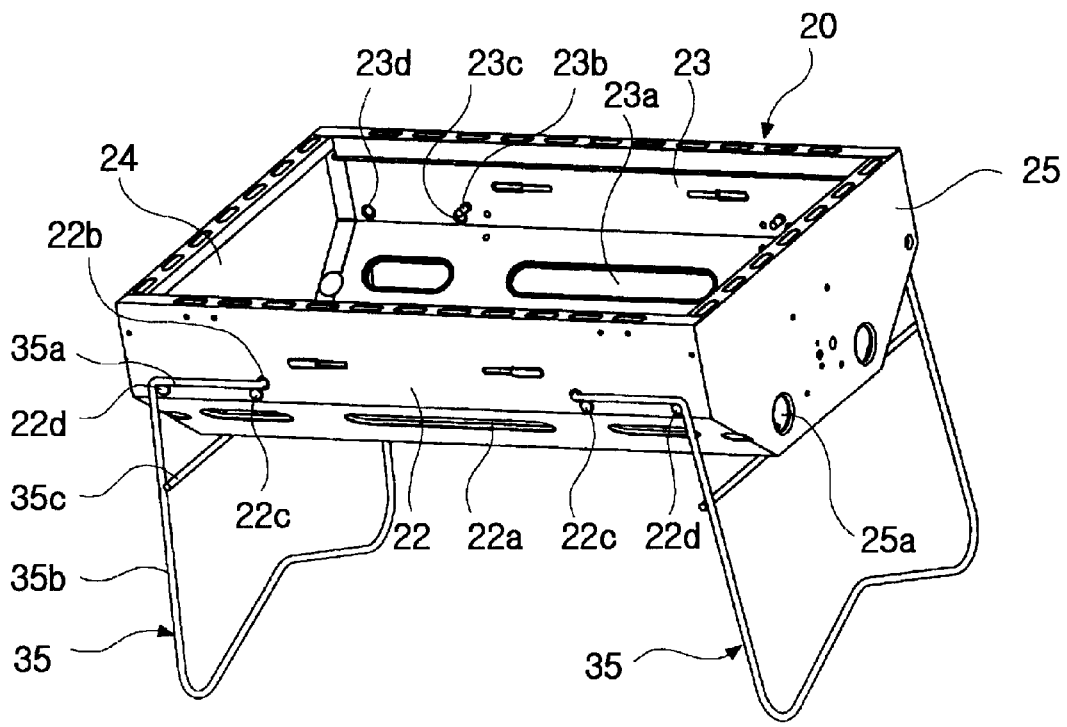
FIG. 40 shows a view illustrating a constitution of the charcoal cooker according to a ninth embodiment of the present invention.
Figure 41:
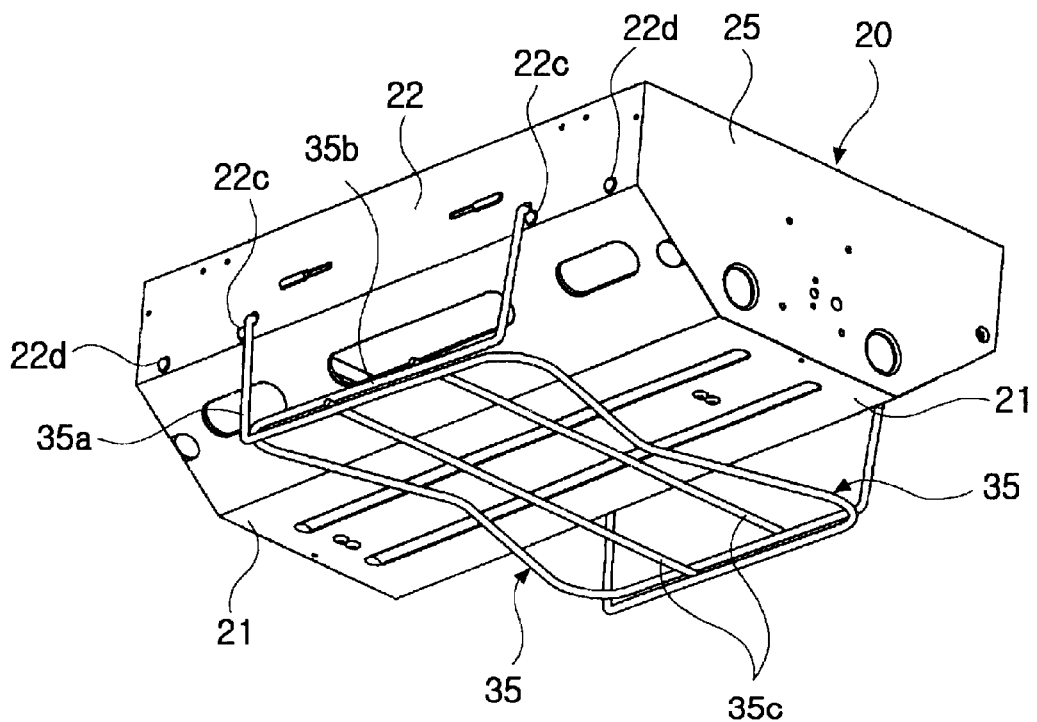
FIG. 41 shows a perspective view illustrating a state where legs of the charcoal cooker shown in FIG. 40 are folded, viewed from the bottom.

FIGS. 40 and 41 show an external appearance of a charcoal cooker according to a ninth embodiment of the present invention.

The charcoal cooker according to the ninth embodiment is equal to the charcoal cooker according to the first embodiment, except for the construction of the legs. Therefore, only the construction of the legs will be explained.

A rod is bended nearly U shape to form the leg 35 of the charcoal cooker according to the ninth embodiment and both ends of the rod is inserted into support holes 22*b* and 23*b* formed in the first longitudinal sidewall 22 and the second longitudinal sidewall 23 of the housing 20 to be pivotally coupled. As shown in FIG. 40, both ends of the rod to form legs are bended at right angles such that most of the rod is vertical and parts close to both ends of the rod are horizontal, in a state that the legs 35 are unfolded. In the state that the legs 35 are infolded, each right-angle bended portion get in contact with a stopper 22*d* or 23*d* so that the legs 35 are held unfolded, not easily folded. As shown in FIG. 41, in a state that the legs 35 are folded, each end of the rod get in contact with another stopper 22*c* or 23*c* so that the legs 35 are held folded, not easily unfolded.

Tenth Embodiment

FIGS. 42 through 46 show a charcoal cooker according to a tenth embodiment of the present invention. The charcoal cooker according to the tenth embodiment is constructed to facilitate use in a table.

Figure 42:
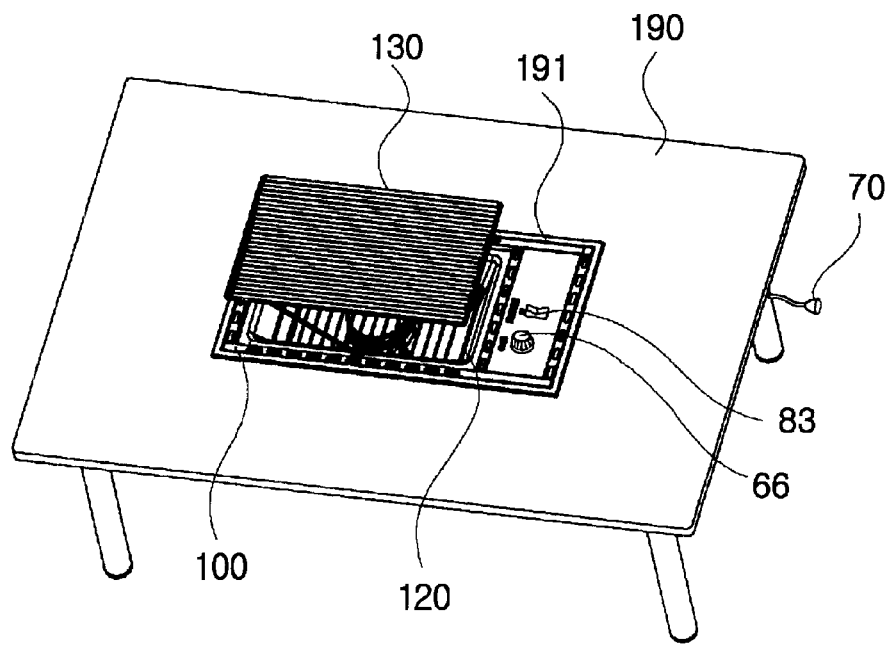
FIG. 42 shows a perspective view illustrating a state where the charcoal cooker according to a tenth embodiment of the present invention is put on a table.
Figure 43:
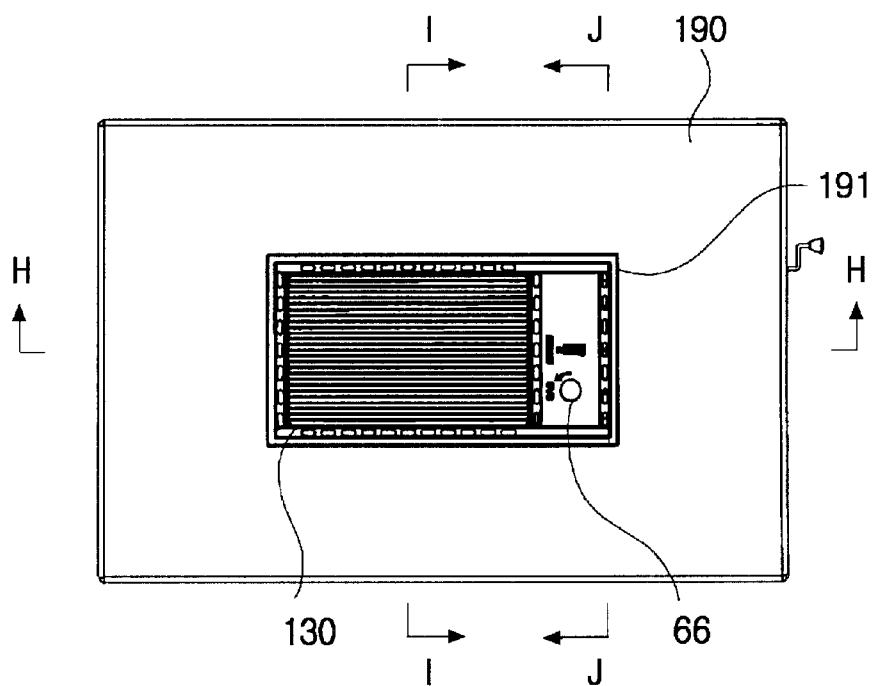
FIG. 43 shows a plan of the charcoal cooker shown in FIG. 42.
Figure 44:
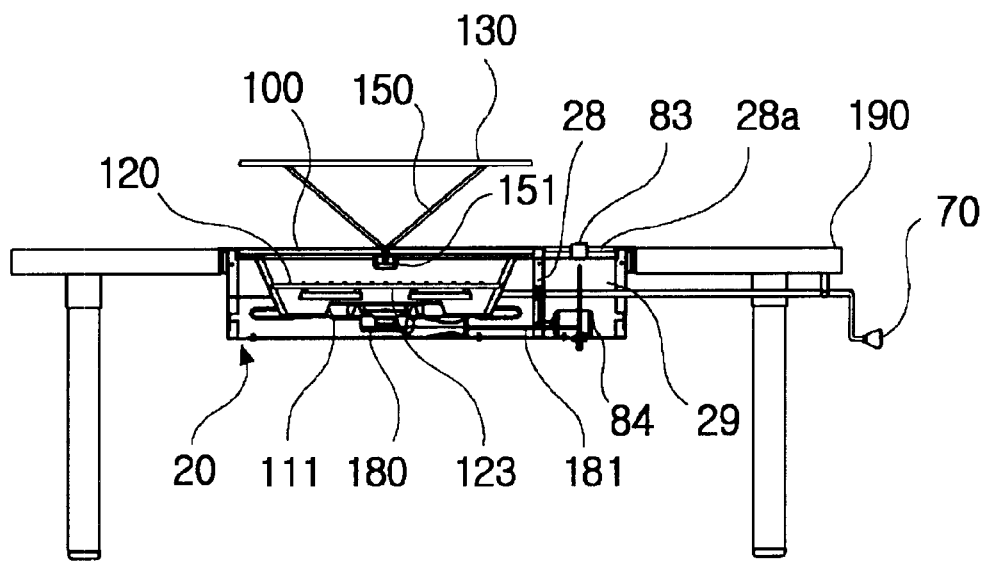
FIG. 44 shows a cross-sectional view taken along a line H—H of FIG. 43.
Figure 45:
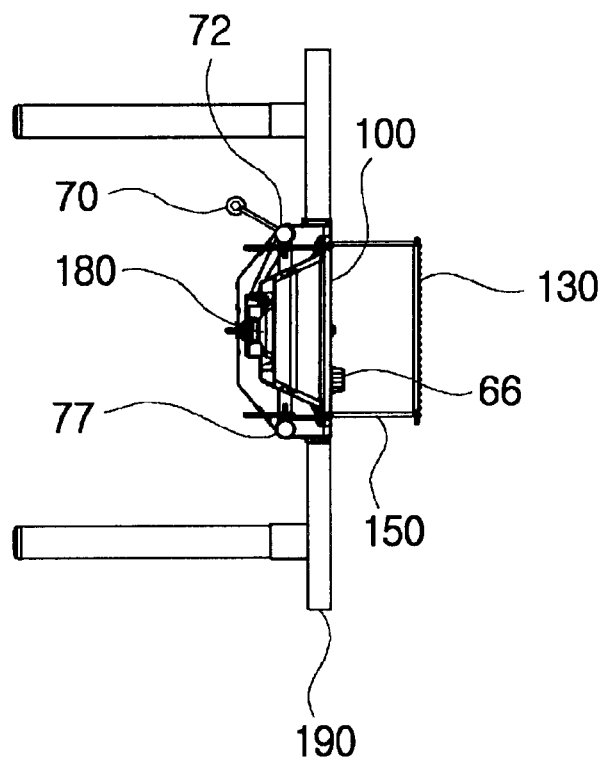
FIG. 45 shows a cross-sectional view taken along a ling I—I of FIG. 43.
Figure 46:
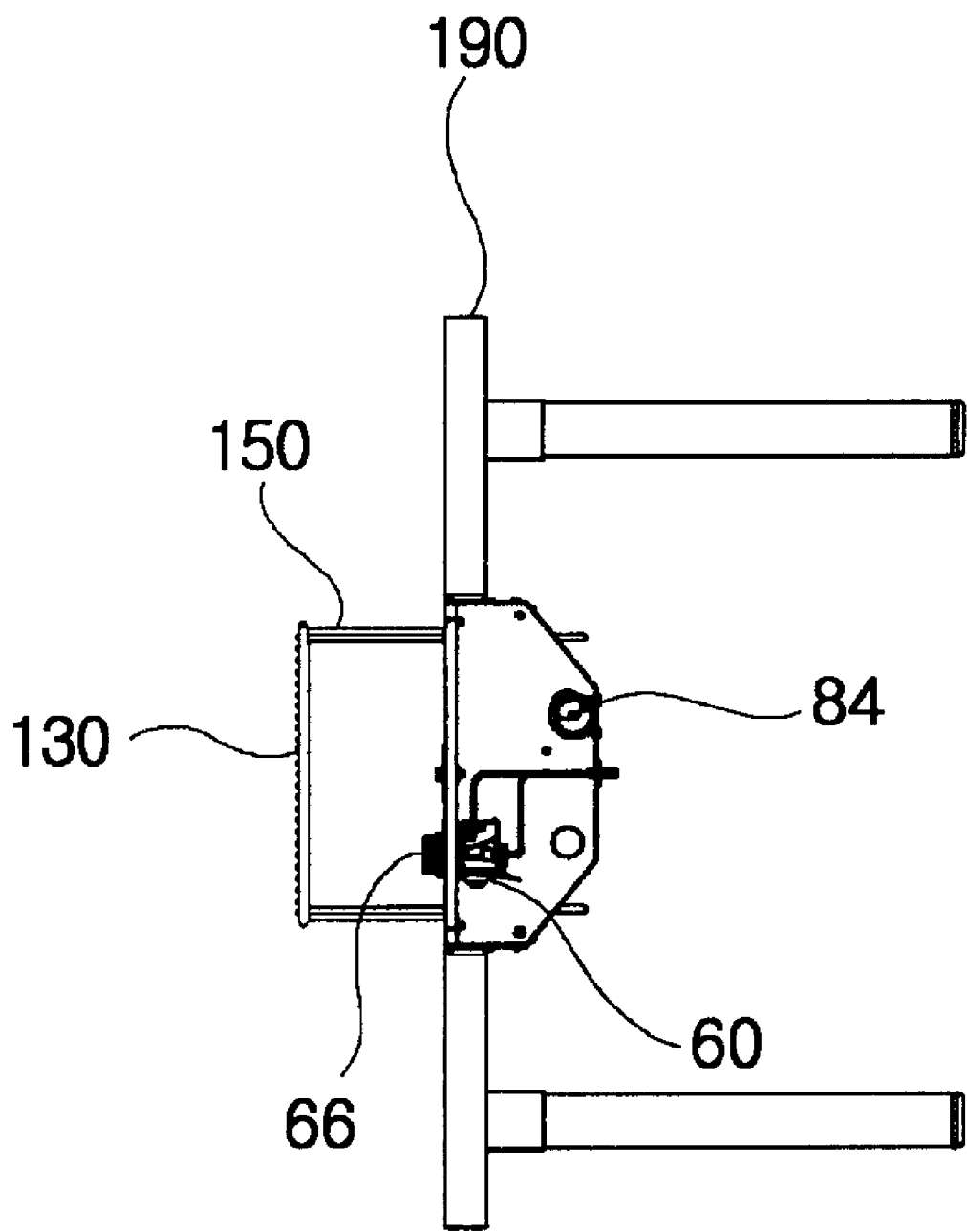
FIG. 46 shows a cross-sectional view taken along a line J—J of FIG. 43.

The charcoal cooker according to the tenth embodiment is supported by a frame 191 of an opening for equipment punched at a center of a table 190, so that the legs for supporting the housing 20 are not required, unlike the charcoal cooker according to the embodiments described above. It is preferable that the gas igniter adopts the construction in which the gas supply part is received in the housing 20 as in the charcoal cooker according to the sixth embodiment. At that time, it is preferable that the gas control knob 66 is exposed from the top surface, not from the side surface. Also, it is preferable that a transfer screw of the food holder lifting means is driven by a driving motor 84, in the same way as in the fifth embodiment, and a switch 83 for operating the driving motor 84 is exposed from the upper surface of the housing 20. However, as shown in FIGS. 42 and 43, a shaft 85 connected to one end of the transfer screw may be extended long to expose the driving handle 70 from a side of the table 190, In the charcoal cooker according to the tenth embodiment, in place of the portable butane gas vessel 200, a general LPG supply pipe can be used as a gas supply source.

In the whole embodiments described above, when the inner dish 100 is made of an enameled sheet metal, washing filth is easy and heat-resistance and durability thereof are good. If the heat-resistance of the inner dish 100 is good, it is prevented that the burning heat is transmitted to the housing 20 to change color of the housing 20. Also, although a user carelessly comes in contact with the housing heated in use, there is no possibility that the user gets burnt.

The charcoal cooker 10 according to the present invention can be employed in almost all cooking such as roasting various foods including meat by use of an iron grid, boiling or frying various foods by means of a pan or an oven and the like.

Also, the cover 40 of the housing 20 can be used for various purpose of a windbreak in cooking outdoors, a keeping-warm cover in cooking foods such as sweet potato which is not done well and the like, as well as a table.

As described above, in the charcoal cooker according to the present invention, kindling charcoal which is a main fuel can be rapidly and easily carried out by means of the charcoal kindling means using gas as a kindling material, smoke or soot is not nearly generated, and control of the amount of heat applied to food in cooking can be easily and finely performed. Also, a volume of the charcoal cooker is very small when it kept and carried, so that it is convenient in keeping and carrying.

The charcoal cooker can be used as a table outdoors without separate assistant means, can be used on a table where the table is equipped, and can be used with the charcoal cooker buried in a table.

Also, according to the present invention, after use, only the inner dish and the food holder is necessary to be washed.

Also, because most of the amount of heat obtained from the burning of fuel is used for cooking food without loss, efficiency of fuel is increased. Even when a user comes in contact with the housing, there is no possibility to get burnt.

Although technical spirits of the present invention has been disclosed with reference to the appended drawings and the preferred embodiments of the present invention corresponding to the drawings has been described, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. A charcoal cooker comprising a charcoal burning part containing and burning charcoal and a cooking part cooking food by use of heat emitted from the charcoal burning part, further comprising:

a housing defining an inner space with a top opening;

an inner dish arranged on a bottom of said housing for receiving filth and defining said charcoal burning part;

a fuel rack arranged at a position spaced from a bottom of said inner dish and in said inner dish;

a support means adapted to support a food holder over said fuel rack; and a food holder lifting means adapted to adjust a gap between said fuel rack and said food holder supported by said support means by displacing said support means, wherein said support means consists of two support rods having equal shape, wherein assuming that a 3 dimensional coordinate system has an X-axis extended in a width direction of said inner dish, each of said support rods has one X-linear portion extended in X-axis direction, two Y-bended portions extended from both ends of said X-linear portion and bended toward Y-axis by 90°, and at least one Z-bended portion extended from the end of at least one of said two Y-bended portions and bended toward Z-axis by about 45°, and wherein each of said support rods is supported to freely swing at a transit portion between said Y-bended portion and said Z-bended portion by at least one longitudinal sidewall of said inner dish.

2. A charcoal cooker according to claim 1, further comprising a charcoal kindling means adapted to kindle charcoal on said fuel rack by emitting flame from under said fuel rack.

3. A charcoal cooker according to claim 1, further comprising a cover constructed to close said top opening of said housing.

4. A charcoal cooker according to claim 1, further comprising legs for supporting said housing at a height properly spaced from the ground.

5. A charcoal cooker according to claim 1, wherein said two support rods are crossed at said transit portion between each of said two Y-bended portions and said Z-bended portion and arranged in a relationship of plane symmetry.

6. A charcoal cooker according to claim 1, wherein said two support rods are separated from each other and arranged in a relationship of plane symmetry.

7. A charcoal cooker according to claim 1, wherein said two support rods are separated from each other and extend in the same direction.

8. A charcoal cooker according to claim 1, wherein each of said two support rods includes a hinge ring attached to said transit portion between each of said two Y-bended portions and said Z-bended portion, and a hinge pin attached to said inner dish and inserted into said hinge ring.

9. A charcoal cooker according to claim 7, further comprising assistant rods bended to form a U shape; and holes punched in a width-directional flange of said inner dish to loosely receive said assistant rods, wherein said assistant rods of said U shape is crossed by a upper side of said X-linear portion in an overturned state and adapted to be inserted into said punched holes in said width-directional flange of said inner dish.

10. A charcoal cooker according to claim 1, further comprising a horizontal-position-keeper for preventing said food holder supported by said support means from horizontally moving when said food holder lifting means displaces said support means.

11. A charcoal cooker according to claim 10, wherein said horizontal-position-keeper comprises guide rods bended to form a U shape; and holes punched in a width-directional flange of said inner dish to loosely receive said guide rods, wherein said U-shaped guide rods is adapted to pass through holes punched in said food holder supported by said X-linear portion of said support rods and to be inserted into said punched holes in said width-directional flange of said inner dish.

12. A charcoal cooker according to claim 1, wherein said food holder lifting means applies horizontal force to said at least one Z-bended portion of said support rods to swing each of said support rods so that said X-linear portion of said support rods is lifted.

13. A charcoal cooker according to claim 1, wherein said food holder lifting means comprises:

at least one transfer screw supported to be free to rotate by at least one longitudinal sidewall of said housing;

two nut blocks provided on said transfer screw and constructed to move on said transfer screw when said transfer screw is rotated;

a restriction pin for limiting the position of said Z-bended portion of said support rods when said nut blocks moves; and a driving means for rotating said transfer screw.

14. A charcoal cooker according to claim 13, wherein said food holder lifting means comprises two transfer screws provided one by one on both longitudinal sidewalls of said housing and an electric motor means operatively connecting said two transfer screws, wherein a first transfer screw of said two transfer screws is rotated by said driving means, and wherein a second transfer screw of said two transfer screws is rotated by gearing with rotation of said first transfer screw.

15. A charcoal cooker according to claim 13, wherein said driving means comprises an electric motor.

16. A charcoal cooker according to claim 2, wherein said charcoal kindling means comprises a gas supply part, a mixture gas jet nozzle and a gas igniter, wherein said mixture gas jet nozzle is provided under said inner dish, and wherein said inner dish is provided with at least a mixture gas inlet hole for importing the mixture gas jetted from said mixture gas jet nozzle into said inner dish.

17. A charcoal cooker according to claim 16, wherein said mixture gas jet nozzle is formed of a pipe having at least a series of mixture gas jet holes, and wherein said mixture gas inlet hole is formed by a slot aligned with a series of mixture gas jet holes.

18. A charcoal cooker according to claim 16, wherein said mixture gas jet nozzle is formed of pipe curved to form a ring, along which at least a series of mixture gas jet holes are punched, wherein a circular hole for receiving said mixture gas jet nozzle is punched in a center of the bottom of said inner dish, and wherein a circular ceiling is provided over said circular hole.

19. A charcoal cooker according to claim 16, wherein said gas igniter has a gas control knob exposed from a sidewall of said housing.

20. A charcoal cooker according to claim 16, wherein said gas igniter has a gas control knob exposed from a top surface of said housing.

21. A charcoal cooker according to claim 16, wherein said gas supply part is adapted to fit a portable butane fuel vessel thereto.

22. A charcoal cooker according to claim 21, wherein a space for receiving said portable butane fuel vessel is provided within said housing.

23. A charcoal cooker according to claim 1, wherein said inner dish comprises at least an air inlet formed through sidewalls thereof for permitting air flow and eaves projected inwardly over each air inlet, respectively.

24. A charcoal cooker according to claim 23, wherein said inner dish is adapted to contain water up to a predetermined height from the bottom thereof.

25. A charcoal cooker according to claim 3, wherein said cover consists of two members divided along a central line of a longitudinal direction, a first member of said two members being constructed to be connected to the upper side of a first longitudinal sidewall of said housing by a hinge and to pivot on said hinge by 180° from a folded position to an unfolded position, and a second member of said two members being constructed to be connected to the upper side of a second longitudinal sidewall of said housing by a hinge and to pivot on said hinge by 180° from a folded position to an unfolded position.

26. A charcoal cooker according to claim 25, further comprising:

two carrying handles attached to said first longitudinal sidewall and said second longitudinal sidewall of said housing, respectively; and at least one projection formed on respective upper surfaces of said first member and said second member of said cover, wherein when said first and second member of said cover is in the unfolded position, said carrying handles support said cover so that said at least one projection serves as a stopper preventing said handles from sliding.

27. A charcoal cooker according to claim 25, further comprising plane grid members built in the inner side of said first and-second member of said cover, respectively, wherein said plane grid members are pivotally coupled to each flange of said first and second member of said cover to pivot on each pivotal axis adjacent to sidewalls thereof.

28. A charcoal cooker according to claim 4, wherein said legs consist of four poles to be inserted into and pulled out from four leg holders provided in said housing.

29. A charcoal cooker according to claim 4, wherein said legs are constructed such that both ends of a rod are bended to form a U shape and are inserted into support holes formed in a first longitudinal sidewall and a second longitudinal sidewall of said housing to be pivotally coupled, and wherein both ends of said rod are bended at right angles such that most of said rod is vertical and a part close to both ends of said rod is horizontal in a state that said legs are unfolded.

\* \* \* \* \*